(12) United States Patent
Ramakrishnan et al.

(10) Patent No.: US 12,495,125 B2
(45) Date of Patent: Dec. 9, 2025

(54) SYSTEM AND METHOD FOR MINIMIZING GREENHOUSE GAS EMISSIONS DUE TO EXECUTION OF VIDEOCONFERENCING SOFTWARE APPLICATIONS ON CLIENT INFORMATION HANDLING SYSTEMS ACROSS AN ENTERPRISE

(71) Applicant: Dell Products, LP, Round Rock, TX (US)

(72) Inventors: Malathi Ramakrishnan, Madurai (IN); Deeder M. Aurongzeb, Austin, TX (US); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 553 days.

(21) Appl. No.: 17/975,059

(22) Filed: Oct. 27, 2022

(65) Prior Publication Data
US 2024/0146871 A1    May 2, 2024

(51) Int. Cl.
*H04N 7/15*     (2006.01)
*H02J 3/00*     (2006.01)
*H04N 7/14*     (2006.01)

(52) U.S. Cl.
CPC ............... *H04N 7/15* (2013.01); *H02J 3/003* (2020.01); *H04N 7/147* (2013.01)

(58) Field of Classification Search
CPC .......... Y02P 90/84; Y02P 90/80; Y02P 90/10; H04N 7/147; H04N 7/15
See application file for complete search history.

(56) References Cited

U.S. PATENT DOCUMENTS 7,742,830 B1 *   6/2010   Botes .................... G06F 9/4893
                                                                    700/32
8,626,450 B2    1/2014   Dooley
(Continued)

FOREIGN PATENT DOCUMENTS

WO    2011/106160 A2    9/2011

OTHER PUBLICATIONS

C. Herrmann, et al., "Sustainability as Strategic Business Model for Profitable Business," 6 pages, May 2014.
(Continued)

*Primary Examiner* — Lam S Nguyen
(74) *Attorney, Agent, or Firm* — Prol Intellectual Property Law, PLLC; H. Kenneth Prol

(57) ABSTRACT

A videoconferencing application carbon dioxide ($CO_2$) emissions minimization system executing on a unified endpoint management platform information handling system may comprise a network interface device to receive operational telemetry measurements for a client information handling system, including power analytics, software application analytics, a geographic location, and a determined $CO_2$ emissions value, a processor to determine a videoconferencing $CO_2$ emissions value that exceeds a threshold value, based on the determined $CO_2$ emissions value and power consumed during execution of a videoconferencing application at the client information handling system, the processor to identify a currently active, user-adjustable videoconferencing policy setting for the videoconferencing application, and the network interface device to transmit a recommended $CO_2$ reduction instruction for display at the client information handling system to de-activate the user-adjustable videoconferencing policy setting to limit the videoconferencing $CO_2$ emissions value to the $CO_2$ emissions threshold value.

20 Claims, 5 Drawing Sheets

(56) References Cited

U.S. PATENT DOCUMENTS

| | | |
|---|---|---|
| 8,780,166 B2 | 7/2014 | Shanmukhadas |
| 8,930,236 B2 | 1/2015 | Gillenson |
| 9,082,391 B2 | 7/2015 | Yermeche |
| 9,503,685 B2 | 11/2016 | Baron, Jr. |
| 9,760,474 B2 | 9/2017 | Pillai |
| 10,902,448 B2 | 1/2021 | Munjal |
| 2009/0292617 A1 | 11/2009 | Sperling |
| 2010/0070404 A1 | 3/2010 | McConnell |
| 2011/0064431 A1* | 3/2011 | Kohri .................. G01R 22/10 399/37 |
| 2011/0074910 A1 | 3/2011 | King |
| 2011/0112698 A1* | 5/2011 | Edwards .............. G05B 17/02 700/291 |
| 2011/0283203 A1 | 11/2011 | Periyannan |
| 2012/0158477 A1 | 6/2012 | Tennenholtz |
| 2013/0246147 A1 | 9/2013 | Chen |
| 2014/0100937 A1 | 4/2014 | Na |
| 2014/0316964 A1 | 10/2014 | Slutsker |
| 2017/0123857 A1 | 5/2017 | Khan |
| 2018/0031533 A1* | 2/2018 | Rawat .................. G06Q 50/06 |
| 2021/0004328 A1 | 1/2021 | Wang |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

SYSTEM AND METHOD FOR MINIMIZING GREENHOUSE GAS EMISSIONS DUE TO EXECUTION OF VIDEOCONFERENCING SOFTWARE APPLICATIONS ON CLIENT INFORMATION HANDLING SYSTEMS ACROSS AN ENTERPRISE

FIELD OF THE DISCLOSURE

The present disclosure generally relates to determining an amount of greenhouse gas emissions that may be attributable to operation of an information handling system. More specifically, the present disclosure relates to a videoconferencing application carbon dioxide ($CO_2$) emissions minimization system for generating recommended $CO_2$ reduction instructions for deactivation of user-adjustable policy videoconference settings for a videoconferencing application to users to limit $CO_2$ emissions due to execution of the videoconferencing application to a $CO_2$ emissions threshold value set on a per-machine or enterprise-wide basis.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
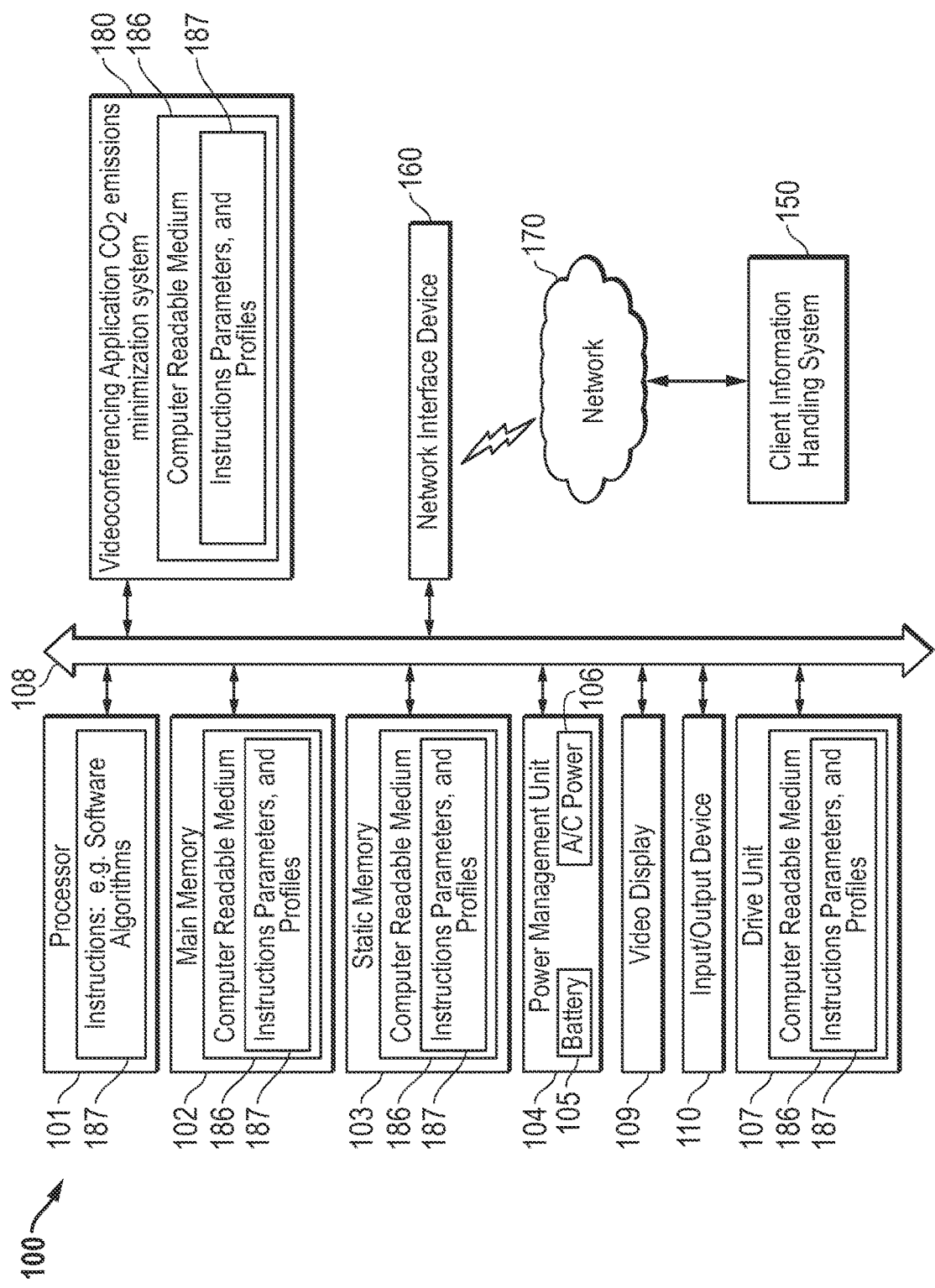
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One major impact on such GHG emissions is efficiency of device operation, including software application execution, hardware operation, and power consumption at end devices such as information handling systems operated by an end user. This efficiency measure may decrease when client information handling systems are used inefficiently or are poorly maintained by a user during a videoconferencing session (e.g., leaving optional or user-adjustable features of a videoconferencing software application to an always-on status, or hardware components set to high performance mode rather than eco-friendly mode). These circumstances may be avoidable through warnings or recommendations provided to the user.

The videoconferencing application $CO_2$ emissions minimization system in embodiments of the present disclosure addresses these issues by generating recommended $CO_2$ reduction instructions for de-activating user-adjustable policy videoconference settings for features of videoconferencing software applications to limit $CO_2$ emissions due to execution of such videoconferencing software applications for participant client information handling systems. In embodiments, the videoconferencing application $CO_2$ emissions minimization system operates at a unified endpoint management (UEM) platform to track $CO_2$ emissions due to execution of a videoconferencing application at a client information handling system participating in a videoconferencing session and managed by an enterprise management system. When it is determined that a user of a client information handling system is participating in a videoconferencing session in which she is not the host or presenter, the videoconferencing application $CO_2$ emissions minimization system in embodiments may determine a videoconferencing $CO_2$ emissions value indicating an amount of $CO_2$ emitted due to execution of the videoconferencing application at that non-host or non-presenting client information handling system. This may be determined in embodiments based on power consumed by the client information handling system due to execution of the videoconferencing application and a geographic location for the client information handling system. GHGs emitted by any given client information handling system (e.g., server) within an enterprise network may be dependent upon power consumed during operation of the client information handling system, and geographic location of the client information handling system. For example, client information handling systems may cause the emission of GHGs by consuming power delivered by power stations that burn fossil fuels, or capture more environmentally friendly solar, wind, or water power. The type of power plant providing such power for consumption by the client information handling system, and consequently, the GHGs emitted during consumption of power may depend upon the geographic location at which such power is consumed. The amount of GHGs emitted during production of each kilowatt-hour (kWh) of power may vary greatly across different geographic regions. For example, on average, power plants within India may emit 1.82 pounds of carbon dioxide ($CO_2$) per kWh of power delivered, while power plants within France may emit 0.136 pounds of $CO_2$ (e.g., one-tenth that of India) per kWh of power delivered.

The videoconferencing application $CO_2$ emissions minimization system in embodiments described herein may ensure these determined videoconferencing $CO_2$ emissions values for each client information handling system in which users are participating in, but not hosting or presenting, stay below a $CO_2$ emissions threshold value for that particular client information handling system. The enterprise system (e.g., via an IT professional) may set such $CO_2$ emissions threshold values for each client information handling system in various embodiments based on geographic location, comparable videoconferencing application $CO_2$ emissions for other client information handling systems, or on enterprise-wide overall $CO_2$ emissions restrictions, for example. When the videoconferencing application $CO_2$ emissions minimization system in embodiments determines that a client information handling system has reached its machine-specific $CO_2$ emissions threshold value, the videoconferencing application $CO_2$ emissions minimization system may identify one or more features of the videoconferencing application that are user-adjustable through adjustment of policy settings for that application that may be altered to decrease the videoconferencing application $CO_2$ emissions value. For example, the videoconferencing application $CO_2$ emissions minimization system in various embodiments may determine whether certain features of the videoconferencing application are currently set to active, such as microphone usage, camera usage, high-definition video recording, high-definition audio recording, application of virtual backgrounds or other visual effects or filters to captured images, of application of audio filters to captured audio samples. Active use of any one of these features in various embodiments may increase the power consumed by various hardware components (e.g., camera, microphone, central processing unit, graphical processing unit, memory, or network interface device), consequently increasing $CO_2$ emitted due to execution of the videoconferencing application.

In another embodiment, the videoconferencing application $CO_2$ emissions minimization system in embodiments described herein may ensure these determined videoconferencing $CO_2$ emissions values across the participant client information handling systems in a videoconferencing session, stay below a $CO_2$ emissions threshold value for that particular videoconferencing session and its participants. The enterprise system (e.g., via an IT professional) may set such a $CO_2$ emissions threshold value based on the number of managed client information handling systems in various embodiments participating and based on geographic location, or on enterprise-wide overall $CO_2$ emissions restrictions, for example. When the videoconferencing application $CO_2$ emissions minimization system in embodiments determines that the participant client information handling systems have reached their videoconference session $CO_2$ emissions threshold value, the videoconferencing application $CO_2$ emissions minimization system may identify one or more features of the videoconferencing application at one or more non-host or non-presenter client information handling systems that are user-adjustable through adjustment of policy videoconferencing settings for that application that may be altered to decrease the videoconferencing application $CO_2$ emissions value. For example, the videoconferencing application $CO_2$ emissions minimization system in various embodiments may determine whether certain features of the videoconferencing application are currently set at participant client information handling systems to active, such as microphone usage, camera usage, high-definition video recording, high-definition audio recording, application of virtual backgrounds or other visual effects or filters to captured images, of application of audio filters to captured audio samples. Active use of any one of these features in various embodiments may increase the power consumed by various hardware components (e.g., camera, microphone, central processing unit, graphical processing unit, memory, or network interface device), consequently increasing $CO_2$ emitted due to execution of the videoconferencing application.

Upon identification of one or more features of the videoconferencing application that are currently set to active, as described directly above, the videoconferencing application $CO_2$ emissions minimization system in embodiments may determine a policy setting $CO_2$ emissions value describing the amount of $CO_2$ emitted due to active use of each of the identified features of the videoconferencing application (e.g., as managed by various policy settings for the videoconferencing application). A neural network may be trained in some embodiments herein to model a relationship between the videoconferencing $CO_2$ emissions value and an activity status for each of these user-adjustable policy videoconference settings of the videoconferencing application. The videoconferencing application $CO_2$ emissions minimization system in embodiments may then use this neural network to estimate the policy setting $CO_2$ emissions value associated with each of the active features identified as described directly above. The videoconferencing application $CO_2$ emissions minimization system may use this information to determine a degree by which the user may decrease the videoconferencing $CO_2$ emissions value by deactivating one or more of these user-adjustable features of the videoconferencing application at a participating client information handling system, particularly one that is not hosting or currently presenting. The videoconferencing application $CO_2$ emissions minimization system in embodiments may then transmit a recommended $CO_2$ reduction instruction to the user of the client information handling system to deactivate one or more of these user-adjustable features, as well as the estimated degree by which deactivation of each feature individually may decrease the videoconferencing $CO_2$ emissions value. In such a way, the videoconferencing application $CO_2$ emissions minimization system in embodiments may notify users of client information handling systems across an enterprise system of the effects of various features of videoconferencing applications on CO2 emissions and ensure each client information handling system operates below the videoconferencing CO2 emissions value.

FIG. 1 illustrates an information handling system 100 according to several aspects of the present disclosure. As described herein, a cloud-based videoconferencing application CO2 emissions minimization system 180 operating at a Unified Endpoint Management (UEM) platform information handling system may notify users of client information handling systems (e.g., 150) across an enterprise system of the effects of various features of videoconferencing applications on CO2 emissions and ensure each or the collective, managed participant client information handling systems (e.g., 150) operates below a CO2 emissions threshold value set by the enterprise system. Some portion or all of the information handling system 100 may operate as a UEM platform information handling system according to embodiments herein. It is further contemplated that some portion or all of the information handling system 100 may describe operation of one or more client information handling systems, shown also at 150, according to embodiments herein. For example, client information handling systems 150 may share several hardware components and functions described with reference to information handling system 100. For discussion, information handling system 100 may be described as the UEM platform information handling system and client information handling systems or systems may be described as 150. Client device operational telemetry measurements, both user-adjustable and other operational telemetry measurements, include power analytics, software application analytics, and event viewer error logs, as well as determined CO2 emissions values particular to each client information handling systems (e.g., 150). These operational telemetry measurements may be gathered during routine monitoring periods from a plurality of client information handling systems 150 at the UEM platform information handling system 100 executing the cloud-based videoconferencing application CO2 emissions minimization system 180. Some or all of the information handling system 100 of FIG. 1 may operate at a UEM platform information handling system or as a client information handling system according to various embodiments herein as described.

Using these crowd-sourced operational telemetry measurements from a plurality of client information handling systems 150, and CO2 emissions values, the cloud-based videoconferencing application CO2 emissions minimization system 180 executing on a hardware processor 101 in embodiments herein may use a crowd-source trained feed-forward neural network modelling a relationship between changes in CO2 emissions values due to execution of a videoconferencing application (e.g., videoconferencing CO2 emissions values) and changes in client device operational telemetry measurements, including user-adjustable operational telemetry measurements such as optional features of the videoconferencing application adjustable through policy settings. The trained feed-forward neural network of the videoconferencing application CO2 emissions minimization system 180 is used to identify one or more changes in such optional features of the videoconferencing application that could cause an individual client information handling system (e.g., 150) to cause CO2 emissions to exceed the enterprise-specified CO2 emissions threshold value. In other embodiments, a rules based system may be operated by the videoconferencing application CO2 emissions minimization system 180 to identify one or more changes in optional features of the videoconferencing application that may be used to reduce CO2 emissions attributed to that client information handling system or across participant client information handling systems. The cloud-based videoconferencing application CO2 emissions minimization system 180 operating at the UEM platform 100 in an embodiment may then transmit recommended CO2 reduction instructions for pro-actively limiting the videoconferencing CO2 emissions values at one or more client information handling systems (e.g., 150) by deactivating one or more of these user-adjustable policy videoconference settings providing for optional features of the videoconferencing application during a video conference session.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. The information handling system 100 may include a memory 102, (with computer readable medium 186 that is volatile (e.g. random-access memory, etc.), nonvolatile memory (read-only memory, flash memory etc.) or any combination thereof), one or more hardware processing resources, such as a central processing unit (CPU), a graphics processing unit (GPU), a Visual Processing Unit (VPU) or a Hardware Accelerator, any one of which may be the hardware processor 101 illustrated in FIG. 1, hardware control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the hardware processor 101, or other hardware processing resources executing code instructions of the videoconferencing application carbon dioxide CO2 emissions minimization system 180, the wireless network interface device 160, a static memory 103 or drive unit 107, a, a video display 109, or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components.

The information handling system 100 may execute code instructions 187, via one or more hardware processing resources, such as for the videoconferencing application carbon dioxide CO2 emissions minimization system 180, that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a hardware processor 101 such as a central processing unit (CPU), a graphics processing unit (GPU), a Visual Processing Unit (VPU), or a hardware accelerator, embedded controllers or hardware control logic or some combination of the same. Any of the hardware processing resources may operate to execute code that is either firmware or software code. Moreover, the information handling system 100 may include memory such as main memory 102, static memory 103, containing computer readable medium 186 storing instructions 187. In other embodiments the information handling system 100 may represent a server information handling system executing, via hardware processing resources, a videoconferencing application carbon dioxide CO2 emissions minimization system 180, operating system (OS) software, application software, BIOS software, or other software applications or drivers detectable by hardware processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the hardware processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, hardware executing software or firmware, dedicated hardware implementations such as application specific integrated circuits, programmable logic arrays and other hardware devices may be constructed to implement one or more of some systems and methods described herein. Applications that may include the hardware processing resources executing systems of various embodiments may broadly include a variety of electronic and computer systems. One or more embodiments described herein may implement functions using two or more specific interconnected hardware modules or devices with related control and data signals that may be communicated between and through the hardware modules, or as portions of an application-specific integrated circuit. Accordingly, the present embodiments encompass hardware processing resources executing software or firmware, or hardware implementations.

In accordance with various embodiments of the present disclosure, the methods described herein may be implemented by firmware or software programs executable by a hardware controller, a hardware processor system, or other hardware processing resources. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, at a device connected to a network 170. Further, the instructions 187 may be transmitted or received over the network 170 via the network interface device 160. The information handling system 100 may include a set of instructions 187 that may be executed on UEM platform hardware processing resources to notify users of client information handling systems (e.g., 150) across an enterprise system of the effects of user-adjustable policy videoconference settings for various features of videoconferencing applications on CO2 emissions and ensure each client information handling system (e.g., 150) separately or collectively operates below the videoconferencing CO2 emissions value. For example, instructions 187 may include a particular example of a videoconferencing application carbon dioxide CO2 emissions minimization system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The videoconferencing application carbon dioxide $CO_2$ emissions minimization system 180 may utilize a computer-readable medium 186 in which one or more sets of instructions 187 may operate in part as software or firmware instructions executed via hardware processing resources on the information handling system 100. The instructions 187 may embody one or more of the methods as described herein. For example, code instructions relating to the videoconferencing application carbon dioxide $CO_2$ emissions minimization system 180, firmware or software algorithms, processes, and/or methods may be stored here. Such code instructions 187 may determine which and generate a recommended $CO_2$ reduction instructions to adjust to policy videoconference settings for a videoconferencing application at a first client information handling system 150 or additional client information handling systems 150 at which a machine-specific $CO_2$ emissions threshold value has been met, for example. In further embodiments, the code instructions 187 may determine which and generate a recommended $CO_2$ reduction instructions to adjust to policy videoconference settings for a videoconferencing application at a first client information handling system 150 or additional client information handling systems 150 at which a $CO_2$ emissions threshold value for the ongoing video conference session has been met, in another example The videoconferencing application carbon dioxide $CO_2$ emissions minimization system 180 may operate on hardware processing resources within a Unified Endpoint Management (UEM) platform 100 that gathers telemetries from a plurality of client information handling systems (e.g., 150) endpoints via the network 170 that describe operating environments for those client information handling systems (e.g., 150). The UEM platform 100 in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a server executing a UEM platform.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the videoconferencing application carbon dioxide $CO_2$ emissions minimization system 180 may be stored in static memory 103, or the drive unit 107 on a computer-readable medium 186 such as a flash memory or magnetic disk in an example embodiment. More specifically, telemetries describing policy settings for videoconferencing application and other executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a hardware processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware, or as software or firmware executing on a hardware processing resource. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The hardware system, hardware device, hardware controller, or hardware module may execute software, including firmware embedded at a device, such as an Intel® Core class hardware processor, ARM® brand hardware processors, Qualcomm® Snapdragon hardware processors, or other hardware processors and chipsets, or other such device, or software capable of operating a relevant environment of the information handling system. The hardware system, hardware device, hardware controller, or hardware module may also comprise a combination of the foregoing examples of hardware, or hardware processors executing firmware or software. In an embodiment an information handling system 150 may include an integrated circuit or a board-level product having portions thereof that may also be any combination of hardware and hardware executing software. Hardware devices, hardware modules, hardware resources, or hardware controllers that are in communication with one another need not be in continuous communication with each other, unless expressly specified otherwise. In addition, hardware devices, hardware modules, hardware resources, or hardware controllers that are in communication with one another may communicate directly or indirectly through one or more intermediaries.

Figure 2:
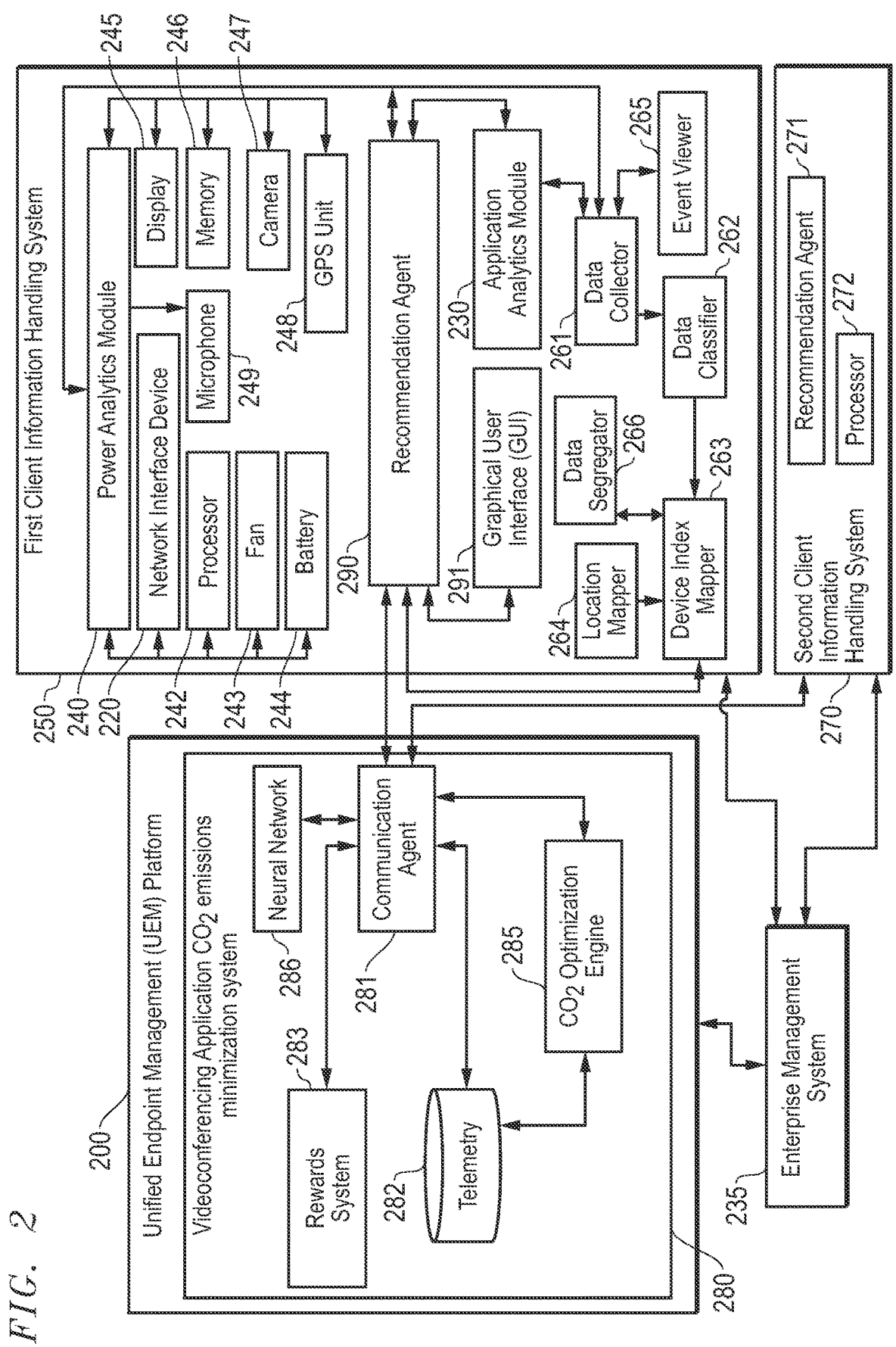
FIG. 2 is a block diagram illustrating a videoconferencing application carbon dioxide ($CO_2$) emissions minimization system executing on a UEM information handling system with client information handling systems according to an embodiment of the present disclosure.

FIG. 2 is a block diagram illustrating a videoconferencing application carbon dioxide ($CO_2$) emissions minimization system 280 for notifying users of client information handling systems across an enterprise system of the effects of user-adjustable policy videoconference settings for various features of videoconferencing applications on $CO_2$ emissions and transmitting recommended $CO_2$ reduction instructions for execution at each or a plurality of client information handling systems to ensure those client information handling systems operate below a machine-specific or videoconference session level videoconferencing $CO_2$ emissions value. A unified endpoint management (UEM) platform 200 in an embodiment may execute a videoconferencing application $CO_2$ emissions minimization system 280 to track $CO_2$ emissions at a client information handling system (e.g., 250 or 270) due to execution of a videoconferencing application at the client information handling system (e.g., 250 or 270) under management of or in communication with an enterprise management system 235. The enterprise management system 235, in some embodiments, may act as an interface between the client information handling system (e.g., 250 or 270) and the UEM platform information handling system 200. The UEM platform 200 executing code instructions of the videoconferencing application $CO_2$ emissions minimization system 280 may determine when a videoconferencing $CO_2$ emissions value indicating an amount of $CO_2$ emitted due to execution of the videoconferencing application at each participating and managed client information handling system (e.g., 250 or 270) to have met a $CO_2$ emissions threshold value. In such a case, the videoconferencing application $CO_2$ emissions minimization system 280 may generate recommended $CO_2$ reduction instructions for de-activating user-adjustable policy videoconference settings for features of videoconferencing software applications to limit $CO_2$ emissions due to execution of such videoconferencing software applications at the client information handling systems (e.g., 250 or 270). recommended $CO_2$ reduction instruction The UEM platform 200 in an embodiment may operate as a cloud-based service in communication with the enterprise management system 235 via a network to identify information technology (IT) issues at a first client information handling system 250, or a second client information handling system 270. The UEM platform 200 and enterprise management system 235 may also provide support for such issues, including automatically updating drivers or hardware components, as needed. In a specific embodiment of the present disclosure, the UEM platform 200 may gather operational telemetry measurements from a plurality of client information handling systems (e.g., 250 and 270) that describe operating environments for those client information handling systems (e.g., geographic location, power consumption analytics, failures or errors associated with one or more hardware components, or analytics for software usage). Some of these gathered operational telemetry measurements in an embodiment may be used to determine a videoconferencing $CO_2$ emissions value indicating the amount of $CO_2$ emitted due to execution of a videoconferencing application at the client information handling system (e.g., 250 or 270). Such a videoconferencing $CO_2$ emissions value determination in an embodiment may be based on power consumed by the client information handling system due to execution of the videoconferencing application and a geographic location for the client information handling system. Data may be provided or accessible to the UEM platform 200 executing the videoconferencing application $CO_2$ emissions minimization system 280 relating to $CO_2$ emissions levels produced per kWh of energy for power client information handling systems at one or more geographic locations for example. This data may be received or accessible from power providers in some embodiments. These operational telemetry measurements may also be used by the videoconferencing application $CO_2$ emissions minimization system 280 to identify one or more user-adjustable policy videoconference settings for the videoconferencing application for optional features of the videoconferencing application are set to active or inactive status.

A videoconferencing application $CO_2$ emissions minimization system 280 in one embodiment may use a rules based approach to determine one or more user-adjustable policy videoconference settings for the videoconferencing application for optional features of the videoconferencing application that may be set to inactive status on one or more participating client information handling system 250 or 270 determined not to be a hosting or actively presenting client information handling system during a video conference session. In another embodiment, the videoconferencing application $CO_2$ emissions minimization system 280 may use a crowd-source trained neural network 286 that models a relationship between changes in videoconferencing $CO_2$ emissions values and changes in various of these user-adjustable policy videoconference settings for the videoconferencing application. For example, client information handling system operational telemetry measurements such as geographic location, power analytics, software analytics, or error log events may be used to predict the degree to which certain user-adjustable policy videoconference settings for the videoconferencing application setting optional features of the videoconferencing application to active status may increase $CO_2$ emitted during execution of the client information handling system (e.g., 250 or 270). These changes in operational efficiency in an embodiment may be represented by the various operational telemetry measurements as they change, such as changes to power analytics, software application analytics, and event viewer log entries. The UEM platform 200 may receive such operational telemetry measurements upon which such predictions may be made from a plurality of client information handling systems (e.g., 250 and 270), which may be managed by the same enterprise management system (e.g., 235), or may be managed by separate enterprise management systems in various embodiments. Further, in one embodiment, the videoconferencing application $CO_2$ emissions minimization system 280 may determine from received active user-adjustable policy videoconference settings whether a user's client information handling system 250, 270 is designated or has been designated in an active status as a host of a videoconference session to determine a host status in one embodiment. In other embodiments, the videoconferencing application CO2 emissions minimization system 280 may determine from received active user-adjustable policy videoconference settings whether a user's client information handling system 250, 270 has an active status of a screenshare function setting in another embodiment to determine active sharing.

Each client information handling system (e.g., 250 or 270) in an embodiment may include a plurality of hardware components. For example, a first client information handling system 250 in an embodiment may include a network interface device 220, a hardware processor (e.g., central processing unit (CPU), graphics processing unit (GPU), or visual processing unit (VPU)) 242, a display 245, a network interface device 220, a memory 246, a fan 243, and one or more components of a power supply unit (e.g., battery 244). In some embodiments, the first client information handling system 250 may further include one or more sensing devices, such as a location sensing devices 248 (e.g., GPS location unit), microphone 249, or camera 247, which may also be used during execution of videoconferencing software applications, for example. In another embodiment, the first client information handling system 250 may further be operably connected to one or more peripheral devices, for example. Such an operably connection may employ a driver or firmware for such a microphone 249 or camera 247 in such an embodiment. One or more of the other hardware components described herein (e.g., 220, 242, 243, 244, 245, 246, 247, 248, or 249) may further operate according to firmware or driver instructions in an embodiment.

A power analytics module 240 in an embodiment may be in communication with the various hardware components (e.g., 220, 242, 243, 244, 245, 246, 247, 248, or 249) and firmware for those components in an embodiment. For example, the power analytics module 240 may monitor power consumption by each of the various hardware components (e.g., 220, 242, 243, 244, 245, 246, 247, 248, or 249) due to execution of the videoconferencing application in an embodiment. In another example embodiment, the power analytics module 240 may also access firmware for hardware components (e.g., 220, 242, 243, 244, 245, 246, 247, 248, or 249) to determine policies or settings for those components at the time of such power measurements. The power analytics module 240, along with the recommendation agent 290 may also receive user recommended CO2 reduction instructions to adjust one or more policy videoconference settings dictating operation of one or more features of a videoconferencing application at the client information handling system (e.g., 250 or 270) pursuant to the videoconferencing application CO2 emissions minimization system 280 determining that execution of the videoconferencing application at the client information handling system (e.g., 250 or 270) is causing CO2 emissions above an enterprise-set CO2 emissions threshold value. These user recommended CO2 reduction instructions may, or may not, be accepted by a user of a client information handling system (e.g., 250 or 270) during a videoconference setting. Presentation of a recommended CO2 reduction instruction and receipt of acceptance or rejection may be made to a user of a client information handling system 250, 270 via a graphical user interface presented to the user on a display screen or window box during the videoconference session.

More specifically, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or on power consumption, data rate, or frequencies used by the network interface device 220. In another example, the power analytics module 240 in an embodiment may determine current usage of a videoconferencing software application as a percentage of total capacity for the hardware processor 242 (e.g., central processing unit (CPU), graphics processing unit (GPU), or visual processing unit (VPU)). In still another example, the power analytics module may determine current usage of the videoconferencing software application as a percentage of total capacity for memory 246, time required to process requests to access such memory 246, and identify optional features of the videoconferencing software application most frequently accessing such memory 246. In yet another example, the power analytics module 240 in an embodiment may determine a usage mode for the display 245, such as day mode, night mode, power reserve mode, or gaming mode (e.g., high-resolution).

In still another example embodiment, the power analytics module 240 may determine policies controlling the periods in which sensing hardware may be operational. More specifically, the power analytics module 240 in an embodiment may determine whether the location sensing device (e.g., GPS unit) 248, microphone 249, or camera 247 are set to remain on at all times, to operate only when a laptop or mobile information handling system is in a certain position (e.g., closed or open), to operate when a mobile device is currently moving, or to operate only when a user is actively executing software applications or certain software applications (e.g., set to a default active status when the videoconferencing application is being executed). The power analytics module 240 in an embodiment may further determine the audio capture instructions setting for the microphone 249, indicating any processing algorithms that may be applied to captured audio (e.g., noise dampening). In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, or other visual effects filters). All information accessed in such a way by the power analytics module 240 in an embodiment may be communicated to a data collector 261.

The power analytics module 240 in an embodiment may also be capable of assessing and adjusting such policies within firmware for one or more hardware components, upon user approval. For example, the power analytics module 240 in an embodiment may determine that an instruction for a network interface device 220 to transceive according to the Bluetooth®, rather than WLAN, WWAN, or in RDP, or reset policies for the network interface device 220 power consumption, data rate, or frequencies to be used to limit CO2 emissions. In another example, the power analytics module 240 in an embodiment may determine that an instruction to adjust the usage mode for the display 245 to a lower power consumption mode, such as power reserve mode, or lower resolution mode may be used to limit CO2 emissions. In still another example embodiment, the power analytics module 240 may decrease the periods in which sensing hardware may be operational, such as restricting such periods to when the first client information handling system 250 is in a closed position, an idle or sleep mode, currently moving, or in startup mode. More specifically, the power analytics module 240 may set the microphone 249 or the camera 247 to a default inactive status during execution of a user session of the videoconferencing application in which it is determined that the user is not the host or actively sharing a screen image of the client information handling system (e.g., 250) within the user session. In another example, the power analytics module 240 in an embodiment may determine power consumed by the network interface device 220 to transceive data (e.g., percentage of total available throughput used), the display 245, the camera 247, or the microphone 249.

In yet another embodiment, the power analytics module 240 may determine that an instruction to adjust the media capture instructions setting for the camera 247 by decreasing a resolution of captured images or a frequency at which those images are captured, or limiting execution of any processing algorithms that may be applied to those images (e.g., zooming, cropping, background image application, boundary recognition, face recognition, smoothing, or other visual effects filters) may be used to limit CO2 emissions. The power analytics module 240 in another example embodiment may determine that an instruction to adjust the audio capture instructions setting for the microphone by limiting execution of any processing algorithms (e.g., noise dampening) may be used to limit CO2 emissions.

In an embodiment, the power analytics module 240 may also be capable of determining the current versions of drivers for various hardware components (e.g., 220, 242, 243, 244, 245, 246, 247, 248, or 249). In still other embodiments, the power analytics module 240 may further determine power consumed during updates made to various firmware or software applications executing via the hardware processor 242 (e.g., CPU, GPU, or VPU).

As described above, the power analytics module 240 may be in communication with a data collector 261, which may also be in communication with an application analytics module 230. In an embodiment, the application analytics module 230 may monitor and adjust execution of software applications within the operating system (OS) for the first client information handling system 250, including a videoconferencing software application. The application analytics module 230 in an embodiment may further track which software applications are running or idle (e.g., executing in the background, or engaged in a user session of the videoconferencing application) at various times, and track current versions of software applications and times at which updates to such software applications are performed.

In another example, the application analytics module 230 may determine current usage as a percentage of total capacity for processor 242 (e.g., CPU, GPU, VPU), time required to complete processing call requests, and identify software applications most frequently accessing the processor 242. In still another example, the application analytics module 230 may determine current usage as a percentage of total capacity for memory 246, time required to process requests to access such memory 246, and identify software applications most frequently accessing such memory 246. In another example, the software analytics module 230 in an embodiment may determine current usage of network interface device resources by software applications as a percentage of total capacity for the network interface device 220 to transceive data (e.g., percentage of total available throughput used). In still another example embodiment, the software analytics module 230 may determine current usage of camera 247, display 245, or microphone 249 resources by the videoconferencing application as a percentage of total capacity for each of these hardware components (e.g., 245, 247, or 249) to operate.

In still another example, the application analytics module 230 may determine current usage as a percentage of total capacity for memory 246, time required to process requests to access such memory 246, and identify software applications most frequently accessing such memory 246. In yet another example, the applications analytics module 230 may determine a number of browsing windows engaged in active sessions, and a time of such active engagement. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may determine that an instruction to cap the percentage of total capacity for the hardware processor 242, the memory 246, or the network interface device 222 that may be used by specifically identified software applications (e.g., a videoconferencing application), or terminate software applications submitting repeated interrupts to the hardware processor 242 may be used to limit CO2 emissions. As another example, the application analytics module 230 in an embodiment may determine that an instruction to terminate or cap the percentage of total capacity for the hardware processor 242, memory 246, or network interface device 222 that may be used by idle, or background applications may be used to limit CO2 emissions. In yet another example, the application analytics module 230 may determine that an instruction to cap the amount of time per day that a browsing software application (e.g., Google ® Chrome®, Firefox C)) maintains active sessions, or capping a number of active windows within such browsing software applications may be used to limit CO2 emissions.

As described herein, the data collector module 261 in an embodiment may gather data regarding hardware configuration and power consumption from the power analytics module 240 and data regarding software performance and hardware processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 242, 243, 244, 245, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., hardware processor error), or a single notification or warning from an analytics module (e.g., failure of a hardware component such as the fan 243). In other cases, a JSON event may include routinely gathered information such as current configurations or policies for various hardware components (e.g., 220, 242, 243, 244, 245, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1544145450 |
| Client Device ID | 456789 |
| Event ID | 123460 |
| Errors, notifications, warnings | Videoconferencing application using 90% network interface device resources; |

TABLE 1-continued

| | |
|---|---|
| | Videoconferencing application using 95% GPU resources; Temperature above 140 degrees F.; |
| Location | New Delhi, India |
| Model | Laptop 7400 |
| Hardware Configuration | WLAN network interface device; WWAN network interface device; Bluetooth ® network interface device; 16 GB memory; X series CPU; G Series GPU; 256 GB Solid State Drive (SSD); 15.6 inch full high definition (HD) organic light emitting diode (OLED) display; Fan driver version 14.2; Webcam Camera type; |
| Hardware Performance | WWAN Interface Device transceived 100 GB; GPU power consumed: 50 W; Display in High Definition Mode; Camera Set to default active state; Camera in High Resolution Mode; System used 8 hours per day; 100 Watts total power consumption per day; Microphone set to default active state; |
| Software Performance | Operating System 10.2; Videoconferencing application user session participation status: participant; Videoconferencing application visual effects filter status active; Videoconferencing application audio filter status active; Videoconferencing application visual effects filter status active; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
"data" :
  {
  "event_id" : 123460,
  "source_ID" : power_analytics_module,
  "timestamp_unixtime_ms" : 1544145450,
  "custom_flags" :
    {
    "videoconferencing_application_NID_usage" : 0.9,
    "videoconferencing_application_GPU_usage" : 0.95,
    "temperature_F" : above_140,
    }
  "device_current_state :
    {
    "NID_1_type" : WLAN,
    "NID_2_type" : WWAN,
    "NID_3_type" : BT,
    "memory_type" : 16_GB,
    "CPU_type" : X_Series,
    "GPU_type" : G_Series,
    "SSD_type" : 256_GB,
    "Display_type" : 15.6_HD_OLED,
    "fan_driver_version" : 14.2,
    "Display_mode" : high_definition,
    "Camera_type" : webcam,
```

```
    "Camera_detection_mode" : continuous_monitor,
    "Camera_capture_mode" : high_resolution,
    "temperature_F" : 142,
    "Microphone_detection_mode" : continuous_monitor,
    "OS_Version" : 10.2,
    "usage_time_hours_perday" : 8,
    "total_power_consumption_watts_perday" : 100,
    "GPU_power_consumption_watts : 50,
    "Videoconferencing_app_user_session_participation_status" : participant,
    "videoconferencing_application_visual_effects_status" : ON,
    "videoconferencing_application_audio_filter_status" : ON,
  }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Some JSON events in an embodiment may indicate a hardware failure, such as a JSON event named "WHEA error," having a value of fan, indicating a failure at the fan. In embodiments where a JSON event indicating a hardware error identifying by the systems internal health assessor appear, the JSON incident may comprise one or more operational telemetry measurements for an information handling system. Upon reformatting of information in an embodiment, the data collector 261 may transmit the JSON incident comprising the operational telemetry measurements to the data classifier 262. In an embodiment, the data classifier 262 may operate to analyze the contents of the JSON incident comprising the operational telemetry measurements, to classify the type of JSON events included therewithin, and to edit the JSON incident to generate a second JSON incident that includes that classification type.

Classification types may be preset according to instructions received by the recommendation agent 290 from the communication agent 281. Such classification types may assist the communication agent 281 and systems internal health assessor 283 in determining when a hardware failure impacting CO2 emissions state for the client information handling system 250 has occurred, or will occur in the immediate future, as described in greater detail below. In example embodiments, classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the videoconferencing application CO2 emissions minimization system 280 with JSON events titled "fan workload" having a value exceeding 85%. In another example, an incident classification for "Config," identifying a hardware configuration or policy that may result in various hardware component failures in an embodiment may be associated with JSON events titled "Config," having a value such as "active_browsing_hours_perday" having a value above 10, "server_mirroring" having a value "ON," "remote_desktop_protocol" having a value "ON," "remote_processor_calls" having a value "ALLOW," "full_power_mode" (e.g., indicating full power supplied to the monitor), "active_sensing_mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver_performance," identifying poor or inefficient driver performance (e.g., as indicated by a percentage of calls to that driver resulting in an error over a preset time period) that may result in various hardware component failures in an embodiment may be associated with JSON events titled "driver_perf" having a value exceeding 50%. In yet another example, an incident classification for "background_usage," identifying relatively intensive usage of software applications operating in idle mode or in the background that may result in various hardware component failures in an embodiment may be associated with JSON events titled "background_usage" having a value exceeding 85%. In still another example, an incident classification for "temperature," identifying internal temperatures (e.g., interior to a chassis surrounding the client information handling system) above a preset maximum internal temperature (e.g., 140 degrees Fahrenheit) in an embodiment be associated with JSON events titled "temperature_F" having a value above 140. Any numerical or percentage maximum application usage threshold values preset as described directly above may be set to any number between one and one hundred in various embodiments described herein.

In an example embodiment, the data classifier 262 in an embodiment may analyze the JSON incident comprising operational telemetry measurements described above to identify whether any of the JSON events and values associated with preset incident classifiers appear within the JSON incident. For example, the data classifier 262 in an embodiment may determine the JSON incident comprising operational telemetry measurements described above includes the JSON event named "videoconferencing_application_NID_usage" having a value of 0.90, or 90%, which is greater than the preset maximum network interface device workload of 85% for any given individual software application. In another example, the data classifier 262 in an embodiment may determine the JSON incident comprising operational telemetry measurements described above includes the JSON event named "videoconferencing_application_GPU_usage" having a value of 0.95, or 95%, which is greater than the preset maximum GPU workload of 85% for any given individual software application. In such embodiments, the data classifier 262 may determine these JSON events are associated with the preset incident classifier "app_usage," and may append this classification to the end of the JSON incident comprising operational telemetry measurements to generate a classified JSON incident comprising operational telemetry measurements:

```
{
    "incident_class" : App_usage,
}
```

In other embodiments in which the data classifier 262 identifies a JSON event "fan_driver_install_time_mins" having a value greater than 60 minutes, or some other preset maximum installation time, or a JSON event "unsuccessful_driver_install_attempts," the data classifier 262 may determine these JSON events and values are associated with the preset incident classifier "driver_perf." In another aspect of such embodiments, the data classifier 262 may identify JSON events such as "active_browsing_hours_perday" having a value above 10, "server_mirroring" having a value "ON," "remote_desktop_protocol" having a value "ON," "remote_processor_calls" having a value "ALLOW." The data classifier 262 in such an embodiment may associate any of these JSON events and values with the classification "Config.". In still another embodiment in which the data classifier 262 identifies a JSON event "temperature_F" having a value above 140, the data classifier 262 may determine this JSON event and value is associated with the preset incident classifier "temperature." In yet another embodiment in which the data classifier 262 identifies a JSON event "humidity_percent" having a value above 60, the data classifier 262 may determine this JSON event and value is associated with the preset incident classifier "humidity" and append that classification to the JSON incident to generate a classified JSON incident comprising operational telemetry measurements such as:

```
}
    "incident_class" : Workload,
    "incident_class" : Temperature,
    "incident_class" : Humidity,
    "incident_class" : Driver_perf,
    "incident_class" : Config,
}
```

The classified JSON incident comprising operational telemetry in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 248. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident comprising operational telemetry measurements to generate an indexed and classified JSON incident comprising operational telemetry measurements that includes this information, such as shown directly below, which is then transmitted to the recommendation agent 290:

```
{
"data" :
{
"event_id" : 123460,
"source_ID" : power_analytics_module,
"timestamp_unixtime_ms" : 1544145450,
"client_device_ID" : 456789,
"client_device_model" : Laptop_7400,
"location" : New Delhi, India,
"custom_flags" :
    {
        "videoconferencing_application_NID_usage" : 0.9,
        "videoconferencing_application_GPU_usage" : 0.95,
        "temperature_F" : above_140,
    }
"device_current_state :
    {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
        "Camera_type" : webcam,
        "Camera_detection_mode" : continuous_monitor,
        "Camera_capture_mode" : high_resolution,
        "Microphone_detection_mode" : continuous_monitor,
        "temperature_F" : 142
        "OS_Version" : 10.2,
        "usage_time_hours_perday" : 8,
        "total_power_consumption_watts_perday" : 100,
        "GPU_power_consumption_watts : 50,
```

```
    "Videoconferencing_app_user_session_participation_status" : participant,
    "videoconferencing_application_visual_effects_status" : ON
    "videoconferencing_application_audio_filter_status" : ON,
    }
  }
  "incident_class" : App_usage,
}
```

The recommendation agent 290 in an embodiment may determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, as shown in the indexed and classified JSON incident.

The location of the client information handling system may define an estimated amount of CO2 (in pounds per kWh) emitted during generation of the power consumed by the client information handling system. Carbon footprint for a client information handling system (e.g., 250 or 270) in an embodiment may be based on the power consumed by the client information handling system (e.g., 250 or 270), the duration of such consumption, and a location CO2 emissions rate describing the amount of CO2 or other GHGs emitted during generation of each Watt of power consumed by the client information handling system (e.g., 250 or 270). In embodiments, the recommendation agent 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the recommendation agent 290 may communicate with the CO2 optimization engine 285 or telemetry 282 to determine the location CO2 emissions rate describing the amount of CO2 of other GHGs emitted during generation of each Watt of power consumed by the client information handling system 250 in New Delhi, India (e.g., the location of the client information handling system 250 as shown in the indexed and classified JSON incident) to be 1.82 pounds CO2 per kWh.

In an example embodiment, the CO2 emissions value may be determined using the equation below to determine the CO2 emissions value for a client information handling system 250 operating in New Delhi, India, for example, where the location CO2 emissions rate is 1.82 pounds CO2 per kWh, the power consumed is 100 Watts over a usage time of 8 hours is equivalent to 1.456 pounds CO2 per day:

$$CO2 \text{ Emissions Value} = \text{location CO2 emissions rate} * \text{Power Consumed} * \text{Usage Time}$$

The recommendation agent in an embodiment may perform this determination of CO2 emissions value for each indexed and classified JSON incident it receives from the device index mapper 263 over the CO2 emissions state determination training period. Following such a determination, the recommendation agent 290 may append one or more JSON events indicating the CO2 emissions value within the indexed and classified JSON incident most recently received from the device index mapper 263 and upon which such a determination was made to create a CO2 determined JSON incident. The recommendation agent 290 may routinely generate such CO2 determined JSON incidents and transmit them to the videoconferencing application CO2 emissions minimization system 280 operating at the UEM platform 200 in an embodiment.

As described herein, the videoconferencing application CO2 emissions minimization system 280 in an embodiment may generate recommended CO2 reduction instructions for de-activating user-adjustable policy videoconference settings for features of videoconferencing software applications to limit CO2 emissions due to execution of such videoconferencing software applications. In an embodiment, the videoconferencing application CO2 emissions minimization system 280 operating at the UEM platform 200 may track CO2 emissions due to execution of a videoconferencing application at a client information handling system (e.g., 250 or 270) managed by an enterprise management system. The videoconferencing application CO2 emissions minimization system 280 in an embodiment may determine, based on CO2 determined JSON incidents received from the client information handling system (e.g., 250) whether the user of the client information handling system 250 is participating in a videoconferencing user session in which she is not the host or the presenter. For example, the videoconferencing application CO2 emissions minimization system 280 may refer to the CO2 determined JSON incident described above to identify the JSON event named "videoconferencing_app_user_session_participation_status," having a value of "participant," indicating the user has joined an active videoconferencing user session as a participant, rather than as a host. In other embodiments, the JSON event "videoconferencing_app_user_session_participation_status" may have another value such as "host," indicating that the user is participating as a host, or "screen_share," indicating that the user is sharing a screen image of the client information handling system 250. In some embodiments, the videoconferencing application CO2 emissions minimization system 280 may only suggest limiting CO2 emissions due to execution of the videoconferencing application when the user is not participating as a host or sharing a screen image within the active user session.

When it is determined that a user of a client information handling system is participating in a videoconferencing user session in which she is not the host or presenter, the videoconferencing application CO2 emissions minimization system 280 in an embodiment may determine a videoconferencing CO2 emissions value indicating an amount of CO2 emitted due to execution of the videoconferencing application at the client information handling system (e.g., 250). As a first step in this determination, the videoconferencing application CO2 emissions minimization system 280 may determine, based on the received CO2 determined JSON incident, hardware resources consumed by the videoconferencing application. For example, the videoconferencing application CO2 emissions minimization system 280 may refer to the CO2 determined JSON incident described above to identify a JSON event named "videoconferencing_applicaiton_GPU_usage," having a value of 0.95 indicating that the videoconferencing application consumed 95% of the available resources for the GPU 242 of the client information handling system 250. As another example, the videoconferencing application CO2 emissions minimization system 280 may refer to the CO2 determined JSON incident described above to identify a JSON event named "videoconferencing_applicaiton_NID_usage," having a value of 0.9 indicating that the videoconferencing application consumed 90% of the available resources for the network interface device 220 of the client information handling system 250. In other embodiments, the CO2 determined JSON incident may also provide similar percentage values of the resources for other hardware components used by the videoconferencing application, such as other types of processors 242 (e.g., CPU, VPU), the microphone 249, the camera 247, the display 245, the memory 246, the fan 243, battery 244, or GPS unit 248.

The videoconferencing application CO2 emissions minimization system 280 in an embodiment may also determine, based on the received CO2 determined JSON incident, power consumed by various hardware components of the client information handling system 250. For example, the videoconferencing application CO2 emissions minimization system 280 may refer to the CO2 determined JSON incident described above to identify a JSON event named "GPU_power_consumption_watts," having a value of 50, indicating that the GPU 242 for the client information handling system 250 consumed 50 Watts. In other embodiments, the CO2 determined JSON incident may also provide similar power consumption values for other hardware components, such as the network interface device 220, other types of processors 242 (e.g., CPU, VPU), the microphone 249, the camera 247, the display 245, the memory 246, the fan 243, battery 244, or GPS unit 248.

The videoconferencing application CO2 emissions minimization system 280 in an embodiment may then determine a videoconferencing CO2 emissions value indicating an amount of CO2 emitted due to execution of the videoconferencing application based on these power and resources consumption determinations described directly above. For example, the videoconferencing application CO2 emissions minimization system 280 in an embodiment may determine that 95% of the 50 Watts consumed by the GPU, or 47.5 Watts of power were consumed during execution of the videoconferencing application. The videoconferencing application CO2 emissions minimization system 280 may also determine that 47.5 Watts of power comprises 47.5% of the 100 Watts consumed by all hardware components of the client information handling system 250, combined. In an embodiment, the videoconferencing application CO2 emissions minimization system 280 may perform such a determination of the percentage of total power consumed by each of the hardware components (e.g., 220, 242, 243, 244, 245, 246, 247, 248, or 249) during execution of the videoconferencing application. Summing each of these determinations for each of the hardware components (e.g., 220, 242, 245, 244, 245, 246, 247, 248, or 249) may provide an overall percentage of total power consumed by the client information handling system 250 during execution of the videoconferencing software application in an embodiment. The videoconferencing CO2 emissions value in an embodiment may then be determined by the videoconferencing application CO2 emissions minimization system 280 by multiplying this overall percentage of total power consumed by the client information handling system 250 during execution of the videoconferencing application by the CO2 emissions value given within the CO2 determined JSON incident. For example, in an embodiment in which 47.5% of all power consumed by the client information handling system occurred due to execution of the client information handling system 250, and the CO2 determined JSON incident includes a JSON event named "CO2_emissions_value_lbsCO2," having a value of 1.456, the videoconferencing application CO2 emissions minimization system 280 may determine a videoconferencing CO2 emissions value of 0.69 pounds of CO2 (e.g., 47.5% of 1.456 pounds CO2).

In various embodiments described herein, an IT professional may set a CO2 emissions threshold value for each of the client information handling systems (e.g., 250 or 270) that dictates a maximum CO2 emitted by a client information handling system (e.g., 250 or 270) during execution of a videoconferencing application to trigger a warning of high CO2 emissions at the client information handling system due to execution of the videoconferencing application and generation of recommended CO2 reduction instructions for lowering such CO2 emissions. These CO2 emissions threshold values may be set for all participating client information handling systems (e.g., 250 and 270) in a videoconference session in some cases. For example, each client information handling system (e.g., 250 or 270) may be associated with a CO2 emissions threshold value equivalent to an average of CO2 emitted across all client information handling systems (e.g., 250 or 270) within the enterprise system engaged in active user sessions in which the user is not the host or sharing a screen image. In other cases, the CO2 emissions threshold values may be set for groups of client information handling systems based on their geographic locations. As described herein, the CO2 emissions for a client information handling system (e.g., 250 or 270) may depend upon geographic location at which the client information handling system (e.g., 250 or 270) consumes power. Thus, the CO2 emissions threshold values in an embodiment may be set to apply to all client information handling systems within the enterprise system located within the same country, city, or region, in which the user is not the host or sharing a screen image. In still other cases, the CO2 emissions threshold values may be on a machine-by-machine basis. For example, the CO2 emissions threshold value may be set as a percentage (e.g., 25%, 50%, 75%, etc.) of each client information handling system's (e.g., 250) determined CO2 emissions value.

When the videoconferencing application CO2 emissions minimization system 280 in an embodiment determines that a client information handling system (e.g., 250) has reached its CO2 emissions threshold value, the videoconferencing application CO2 emissions minimization system 280 may identify one or more features of the videoconferencing application that are user-adjustable through adjustment of policy videoconference settings for that application that may be altered to decrease the videoconferencing application CO2 emissions value. For example, the videoconferencing application CO2 emissions minimization system in various embodiments may determine whether certain features of the videoconferencing application are currently set to active, such as microphone usage, camera usage, high-definition video recording, high-definition audio recording, application of virtual backgrounds or other visual effects or filters to captured images, of application of audio filters to captured audio samples.

Active use of any one of these features in various embodiments may increase the power consumed by various hardware components (e.g., camera, microphone, central processing unit, graphical processing unit, memory, or network interface device), consequently increasing CO2 emitted due to execution of the videoconferencing application. For example, the videoconferencing application CO2 emissions minimization system 280 in an embodiment may reference the CO2 determined JSON event described above to identify the JSON event named "camera_detection_mode," having a value of "continuous_monitor," indicating that the camera is set to a default recording mode. As another example, the videoconferencing application CO2 emissions minimization system 280 in an embodiment may reference the CO2 determined JSON event described above to identify the JSON event named "microphone_detection_mode," having a value of "continuous_monitor," indicating that the microphone is set to a default recording mode. In still another example, the videoconferencing application CO2 emissions minimization system 280 in an embodiment may reference the CO2 determined JSON event described above to identify the JSON event named "camera_capture_mode," having a value of "high_resolution," indicating that the camera is set to record in high resolution, which may increase power consumed by the camera 247 and the GPU 242 processing recorded images. In yet another example, the videoconferencing application CO2 emissions minimization system 280 in an embodiment may reference the CO2 determined JSON event described above to identify the JSON event named "videoconferencing_application_visual_effects_status" having a value of "on," indicating that one or more visual effects filters are being applied to recorded images, such as zooming, cropping, background image application, boundary recognition, face recognition, smoothing, or other visual effects filters. In still another example, the videoconferencing application CO2 emissions minimization system 280 in an embodiment may reference the CO2 determined JSON event described above to identify the JSON event named "videoconferencing_application_audio_filter_status" having a value of "on," indicating that one or more audio filters are being applied to recorded audio samples, such as noise reduction filters. One or more of these features of the videoconferencing application identified within the CO2 determined JSON incident in an embodiment may be user-adjustable by adjusting the policy settings for the videoconferencing application via the power analytics module 240, for example.

Upon identification of one or more features of the videoconferencing application that are currently set to active, as described directly above, the videoconferencing application CO2 emissions minimization system 280 in an embodiment may determine a policy setting CO2 emissions value describing the amount of CO2 emitted due to active use of each of the identified features of the videoconferencing application (e.g., as managed by various policy videoconference settings for the videoconferencing application). A neural network 286 may be trained in an embodiment to model a relationship between changes in the videoconferencing CO2 emissions value and an activity status for each of these user-adjustable policy videoconference settings of the videoconferencing application. The videoconferencing application CO2 emissions minimization system 280 in an embodiment may then use this neural network 286 to estimate the policy setting CO2 emissions value associated with each of the active features identified as described directly above. The videoconferencing application CO2 emissions minimization system may use this information to determine a degree by which the user may decrease the videoconferencing CO2 emissions value by deactivating one or more of these user-adjustable policy videoconference settings for features of the videoconferencing application. For example, the videoconferencing application CO2 emissions minimization system 280 may determine that setting the camera to inactive, or ceasing recording of images via the camera 247 may decrease the determined CO2 emissions value by 5%. In another example, the videoconferencing application CO2 emissions minimization system 280 may determine that setting the microphone 249 to mute or inactive may decrease the determined CO2 emissions value by an additional 2%. This process may be repeated for each of the user-adjustable policy videoconference settings for the videoconferencing application currently set to active status, such as application of audio or visual effects to captured images or sound, or capture instructions for the camera 247.

The videoconferencing application CO2 emissions minimization system in embodiments may then transmit a recommended CO2 reduction instruction to the user of the client information handling system 250 to deactivate one or more of these user-adjustable policy videoconference settings for those features (e.g., camera 247 set to record, microphone 249 set to record), as well as the estimated degree by which deactivation of each feature individually may decrease the videoconferencing CO2 emissions value (e.g., 5% and 2%, respectively). In such a way, the videoconferencing application CO2 emissions minimization system 250 in embodiments may notify users of client information handling systems (e.g., 250) across an enterprise system of the effects of various features of videoconferencing applications on CO2 emissions and ensure each client information handling system (e.g., 250) operates below the videoconferencing CO2 emissions value set for that device.

The recommendation agent 290 at a client information handling system 250, 270 in an embodiment may receive these recommended CO2 reduction instructions for deactivation of one or more user-adjustable features of the videoconferencing application. These recommended CO2 reduction instructions and the degree by which each recommendation may decrease CO2 emissions due to execution of the videoconferencing application may be displayed to the user via the graphical user interface (GUI) 291 during the videoconference session. The user of the client information handling system 250 or 270 in an embodiment may then choose one or more, or none of the recommended CO2 reduction instructions for implementation at the client information handling system 250 or 270. In an embodiment in which the user selects to implement one or more of the recommended instructions displayed via the GUI 291, the recommendation agent 290 may work in tandem with the power analytics module 240 to adjust policy settings for the videoconferencing application to implement the recommended and user-approved instructions. For example, in an embodiment in which the user has chosen to implement the recommended instruction to deactivate the camera 247 during the videoconferencing application user session, the power analytics module 240 may adjust the policy videoconference settings for the videoconferencing application to deactivate the camera 247, or may limit or cease power consumption by the camera 247. In another example, in an embodiment in which the user chooses to implement a recommended instruction to deactivate a visual effects filter of the videoconferencing application, such as application of a virtual background, the power analytics module 240 may adjust the policy settings for the videoconferencing application to deactivate the visual effects feature(s) of the videoconferencing application. In such embodiments, the recommendation agent 290 may also transmit a recommendation acceptance notification to the videoconferencing application CO2 emissions minimization system 280 for storage in telemetry 282.

In an embodiment in which the user rejects a recommended CO2 reduction instruction received from the videoconferencing application CO2 emissions minimization system 280, the recommendation agent 290 may transmit a recommendation rejection notification to the videoconferencing application CO2 emissions minimization system 280 for storage in telemetry 282. For example, in an embodiment in which the user rejects a recommended instruction to deactivate the microphone 249, the recommendation agent 290 may transmit a notification that the user rejected the recommendation to deactivate the microphone 249, as well as a notification that the neural network 286 predicted that that recommended CO2 reduction instruction could have decreased CO2 emissions due to execution of the videoconferencing application at the client information handling system 250 by 2%.

In some embodiments, users may be rewarded for accepting recommended CO2 reduction instructions for decreasing CO2 emitted during execution of the videoconferencing application at the client information handling system 250. For example, a reward system 283 may search telemetry 282 to identify a stored indication that the user of the client information handling system 250 has accepted a recommended CO2 reduction instruction to deactivate the camera, and that such deactivation resulted in 5% decrease in CO2 emitted due to execution of the videoconferencing application. The reward system 283 in those embodiments may transmit an incentive to the user of the client information handling system 250 for display via GUI 291 to continue to decrease CO2 emitted due to execution of the videoconferencing application, as recommended by the videoconferencing application CO2 emissions minimization system 280. Such incentives may take the form of monetary values, credits, upgrades, recognition within the enterprise system, or other forms of reward.

In other embodiments in which users reject recommended CO2 reduction instructions for decreasing CO2 emitted during execution of videoconferencing applications, the videoconferencing application CO2 emissions minimization system 280 may report such rejections to IT professionals within the enterprise management system 210, for example. This may allow the enterprise management system 210 to monitor such potentially problematic users. In such a way, the videoconferencing application CO2 emissions minimization system in embodiments may notify users of client information handling systems across an enterprise system of the effects of various features of videoconferencing applications on CO2 emissions and ensure each client information handling system operates below the videoconferencing CO2 emissions value.

Figure 3:
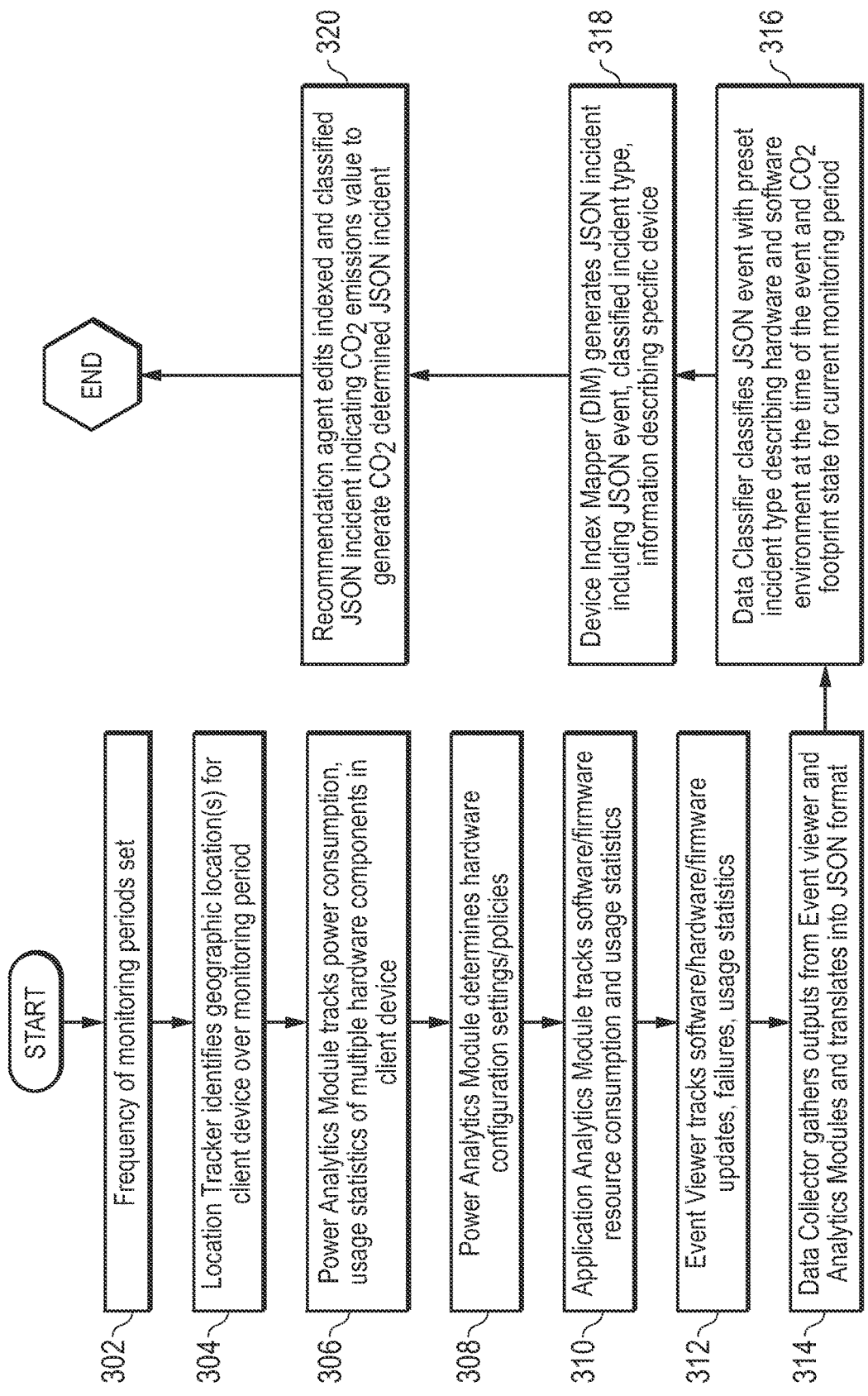
FIG. 3 is a flow diagram illustrating a method of gathering power and application analytics for tracking $CO_2$ emissions due to execution of a videoconferencing session for at least one client information handling system according to an embodiment of the present disclosure.

FIG. 3 is a flow diagram illustrating a method of gathering power and application analytics for tracking and limiting CO2 emissions due to execution of a videoconferencing application at one or more client information handling systems of an enterprise system according to an embodiment of the present disclosure. As described herein, the videoconferencing application CO2 emissions minimization system operating at a unified endpoint management (UEM) platform may track CO2 emissions due to execution of a videoconferencing application at a client information handling system managed by an enterprise management system. When it is determined that a user of a client information handling system is participating in a videoconferencing user session in which she is not the host or presenter, the videoconferencing application CO2 emissions minimization system in embodiments may determine a videoconferencing CO2 emissions value indicating an amount of CO2 emitted due to execution of the videoconferencing application at the client information handling system.

The videoconferencing application CO2 emissions minimization system in an embodiment may also identify one or more user-adjustable policy videoconference settings for features of the videoconferencing application that are user-adjustable through adjustment of those policy videoconference settings and may be altered to decrease the videoconferencing application CO2 emissions value. In an embodiment, the videoconferencing application CO2 emissions minimization system may then determine a policy setting CO2 emissions value describing the amount of CO2 emitted due to user-adjustable policy videoconference settings for active use of each of the identified features of the videoconferencing application and use a trained neural network to estimate the policy setting CO2 emissions value associated with each of the user-adjustable policy videoconference settings for active features identified as described directly above. The videoconferencing application CO2 emissions minimization system may use this information to determine a degree by which the user may decrease the videoconferencing CO2 emissions value by deactivating one or more of these user-adjustable policy videoconference settings for user-adjustable features of the videoconferencing application. FIG. 3 describes the method of gathering these operational telemetry measurements from a plurality of client information handling systems in the form of JSON incidents in an example embodiment.

At block 302, a user of the client information handling system or IT professional within an enterprise management system in an embodiment may set a monitoring period for monitoring CO2 emissions states at the information handling system. For example, in an embodiment described with reference to FIG. 2, the data collector 261 in an embodiment may gather data regarding hardware configuration and power consumption from the power analytics module 240 and data regarding software performance and hardware processor usage from the application analytics module 230 at preset intervals. For example, such a preset interval may be set to a default monitoring period value (e.g., one hour, one day, one week, one month, or other), or may be set by the user of the first client information handling system 200 via the graphical user interface (GUI) 290.

Proceeding to block 304, a location tracking in an embodiment may identify a geographic location for the client information handling system over the user-specified monitoring period. For example, the location sensing unit 248 in an embodiment may determine a geographic location (e.g., zip code, GPS coordinates, city, state, country) in which the first client information handling system 250 is operating.

At block 306, the power analytics module may track power consumption of multiple hardware components in the client information handling system in an embodiment. For example, the power analytics module 240 in an embodiment may monitor power consumption by each of the various hardware components (e.g., 220, 242, 243, 244, 245, 246, 247, 248, or 249) in an embodiment. In some embodiments, such hardware power consumption may be attributed to specific software applications. For example, the power analytics module 240 in an embodiment may determine power consumed by the hardware processor 242 (e.g., central processing unit (CPU), graphics processing unit (GPU), or visual processing unit (VPU)). In still another example, the power analytics module may determine power consumed by the memory 246. In another example, the power analytics module 240 in an embodiment may determine power consumed by the network interface device 220 to transceive data (e.g., percentage of total available throughput used), the display 245, the camera 247, or the microphone 249.

The power analytics module in an embodiment may determine hardware configurations, settings, or policies at block 308. For example, the power analytics module 240 may access firmware for hardware components (e.g., 220, 242, 243, 244, 245, 246, 247, 248, or 249) to determine policies or settings for those components at the time of power measurements made at block 306. More specifically, the power analytics module 240 may determine user-adjustable policy videoconference settings for the videoconference session and hardware consumed by active use of such features of the videoconferencing application. In other example embodiments, the power analytics module 240 in an embodiment may determine whether a network interface device 220 is transceiving according to WLAN, WWAN, Bluetooth®, Remote Desktop Protocol (RDP), or Near Field Communication (NFC) standards, as well as policies setting a preference for one type of standard over another, or restrictions on operation of the first client information handling system 250 as a mirror server, on allowing remote users to make calls to the hardware processor 242, or on power consumption, data rate, or frequencies used by the network interface device 220.

In still another example embodiment, the power analytics module 240 may determine policies controlling the periods in which sensing hardware may be operational. More specifically, the power analytics module 240 in an embodiment may determine whether the location sensing device (e.g., GPS unit) 248, microphone 249, or camera 247 are set to remain on at all times, to operate only when a laptop or mobile information handling system is in a certain position (e.g., closed or open), to operate when a mobile device is currently moving, or to operate only when a user is actively executing software applications or certain software applications (e.g., set to a default active status when the videoconferencing application is being executed). As part of this, the power analytics module 240 may determine the user-adjustable policy videoconference settings for a videoconference session. For example, the power analytics module 240 in an embodiment may further determine the audio capture instructions setting for the microphone 249, indicating any processing algorithms that may be applied to captured audio (e.g., noise dampening). In yet another embodiment, the power analytics module 240 may determine the media capture instructions setting for the camera 247, indicating a resolution of captured images, a frequency at which those images are captured, and any processing algorithms that may be applied to those images (e.g., zooming, cropping, background image application, boundary recognition, face recognition, smoothing, or other visual effects filters). All information accessed in such a way by the power analytics module 240 in an embodiment may be communicated to a data collector 261.

At block 310, a hardware processor executing the application analytics module may track usage of various hardware components by a videoconferencing software application in an embodiment. For example, in an embodiment, the application analytics module 230 may monitor execution of software applications within the operating system (OS) for the first client information handling system 200. The application analytics module 230 in an embodiment may further track which software applications are running or idle (e.g., executing in the background) at various times, track CPU utilization, and track current versions of software applications and times at which updates to such software applications are performed. In another example, the application analytics module 230 may determine current usage as a percentage of total capacity for processor 242 (e.g., CPU, GPU, VPU), time required to complete processing call requests, and identify software applications most frequently accessing the processor 242. In still another example, the application analytics module 230 may determine current usage as a percentage of total capacity for memory 246, time required to process requests to access such memory 246, and identify software applications most frequently accessing such memory 246, and this includes operation of the videoconferencing software application. In another example, the software analytics module 230 in an embodiment may determine current usage of network interface device resources by software applications as a percentage of total capacity for the network interface device 220 to transceive data (e.g., percentage of total available throughput used). In still another example embodiment, the software analytics module 230 may determine current usage of camera 247, display 245, or microphone 249 resources by the videoconferencing application as a percentage of total capacity for each of these hardware components (e.g., 245, 247, or 249) to operate.

The event viewer may track failed attempts at firmware or software updates in an embodiment at block 312. For example, the data collector 261 may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error, a failed attempt at firmware or software updating, or an unusually high consumption of power by hardware components, or identifying the driver or software application associated with a failed update. Such WHEA events may be associated with data packets that specifically identify the hardware component (e.g., 220, 242, 243, 244, 245, 246, 247, 248, or 249) producing the error or consuming the unusually high power levels.

At block 314, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the hardware processor executing code instructions of the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the videoconferencing application $CO_2$ emissions minimization system 280. For example, the data collector 261 may generate the following JSON incident based on the information gathered and stored in Table 1, above:

```
{
 "data" :
 {
  "event_id" : 123460,
  "source_ID" : power_analytics_module,
  "timestamp_unixtime_ms" : 1544145450,
  "custom_flags" :
    {
      "videoconferencing_application_NID_usage" : 0.9,
      "videoconferencing_application_GPU_usage" : 0.95,
      "temperature_F" : above_140,
    }
  "device_current_state :
    {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version" : 14.2,
      "Display_mode" : high_definition,
      "Camera_type" : webcam,
      "Camera_detection_mode" : continuous_monitor,
      "Camera_capture_mode" : high_resolution,
      "temperature_F" : 142,
      "Microphone_detection_mode" : continuous_monitor,
      "OS_Version" : 10.2,
      "usage_time_hours_perday" : 8,
      "total_power_consumption_watts_perday" : 100,
      "GPU_power_consumption_watts : 50,
      "Videoconferencing_app_user_session_participation_status" : participant,
      "videoconferencing_application_visual_effects_status" : ON,
      "videoconferencing_application_audio_filter_status" : ON,
    }
 }
}
```

At block 316, the data classifier in an embodiment may classify objects within the gathered JSON event with preset incident types describing hardware component power consumption, or software application execution and usage for the client information handling system at the time of the event. For example, the data classifier 262 in an embodiment may edit the JSON incident created at block 314 by adding an incident classifier. More specifically, the data classifier 262 in an embodiment may analyze the JSON incident comprising operational telemetry measurements generated at block 314 to identify whether any of the JSON events and values associated with preset incident classifiers appear within the JSON incident.

For example, the data classifier 262 in an embodiment may determine the JSON incident comprising operational telemetry measurements described above includes the JSON event named "videoconferencing_application_NID_usage" having a value of 0.90, or 90%, which is greater than the preset maximum network interface device workload of 85% for any given individual software application. In another example, the data classifier 262 in an embodiment may determine the JSON incident comprising operational telemetry measurements described above includes the JSON event named "videoconferencing_application_GPU_usage" having a value of 0.95, or 95%, which is greater than the preset maximum GPU workload of 85% for any given individual software application. In such embodiments, the data classifier 262 may determine these JSON events are associated with the preset incident classifier "app_usage," and may append this classification to the end of the JSON incident comprising operational telemetry measurements to generate a classified JSON incident comprising operational telemetry measurements:

```
{
    "incident_class" : App_usage,
}
```

The hardware processor may execute code instructions of the device index mapper in an embodiment to generate a classified and indexed JSON incident including one or more JSON events and classified incident types at block 318. For example, the device index mapper (DIM) 263 in an embodiment may associate the classified JSON incident comprising operational telemetry measurements with a device ID and device model for the first client information handling system 200. Such a device ID in an embodiment may be one of several device IDs for a plurality of information handling systems (e.g., including the first and second client information handling systems 250 and 270) stored at the videoconferencing application CO2 emissions minimization system 280. The device index mapper 263 in an embodiment may then edit the classified JSON incident comprising operational telemetry measurements to generate an indexed and classified JSON incident that includes this information:

```
{
 "data" :
 {
  "event_id" : 123460,
  "source_ID" : power_analytics_module,
```

-continued

```
"timestamp_unixtime_ms" : 1544145450,
"client_device_ID" : 456789,
"client_device_model" : Laptop_7400,
"location" : New Delhi, India,
"custom_flags" :
   {
      "videoconferencing_application_NID_usage" : 0.9,
      "videoconferencing_application_GPU_usage" : 0.95,
      "temperature_F" : above_140,
   }
"device_current_state :
   {
      "NID_1_type" : WLAN,
      "NID_2_type" : WWAN,
      "NID_3_type" : BT,
      "memory_type" : 16_GB,
      "CPU_type" : X_Series,
      "GPU_type" : G_Series,
      "SSD_type" : 256_GB,
      "Display_type" : 15.6_HD_OLED,
      "fan_driver_version" : 14.2,
      "Display_mode" : high_definition,
      "Camera_type" : webcam,
      "Camera_detection_mode" : continuous_monitor,
      "Camera_capture_mode" : high_resolution,
      "temperature_F" : 142,
      "Microphone_detection_mode" : continuous_monitor,
      "OS_Version" : 10.2,
      "usage_time_hours_perday" : 8,
      "total_power_consumption_watts_perday" : 100,
      "GPU_power_consumption_watts : 50,
      "Videoconferencing_app_user_session_participation_status" : participant,
      "videoconferencing_application_visual_effects_status" : ON,
      "videoconferencing_application_audio_filter_status" : ON,
   }
}
{
"incident_class" : App_usage,
}
```

The device index mapper may transmit the JSON incident generated at block 318 to the recommendation agent of the client information handling system in an embodiment.

The recommendation agent in an embodiment may edit the indexed and classified JSON incident to include a CO2 emissions value of the client information handling system at block 320. The recommendation agent 290 in an embodiment may first determine a CO2 emissions value for the client information handling system 250 based on the classified and indexed JSON incident received from the device index mapper 263. This CO2 emissions value determination may be made based on the location of the device, the power consumed by each of the hardware components, the usage time for such power consumption, and the efficiency of the battery, as shown in the indexed and classified JSON incident.

The location of the client information handling system may define an estimated amount of CO2 (in pounds per kWh) emitted during generation of the power consumed by the client information handling system. Carbon footprint for a client information handling system (e.g., 250 or 270) in an embodiment may be based on the measured power consumed by the client information handling system (e.g., 250 or 270), the duration of such consumption, and a location CO2 emissions rate describing the amount of CO2 or other GHGs emitted during generation of each Watt of power consumed by the client information handling system (e.g., 250 or 270). In embodiments, the recommendation agent 290 may communicate with the CO2 optimization engine 285 or telemetry 282 to determine such a location CO2 emissions rate for the client information handling systems 250 based on the location given within an indexed and classified JSON incident (e.g., as shown directly above) and stored in telemetry 282. For example, the recommendation agent 290 may communicate with the CO2 optimization engine 285 or telemetry 282 to determine the location CO2 emissions rate describing the amount of CO2 of other GHGs emitted during generation of each Watt of power consumed by the client information handling system 250 in New Delhi, India (e.g., the location of the client information handling system 250 as shown in the indexed and classified JSON incident) to be 1.82 pounds CO2 per kWh.

In an example embodiment, the CO2 emissions value may be determined using the equation below to determine the CO2 emissions value for a client information handling system 250 operating in New Delhi, India, for example, where the location CO2 emissions rate is 1.82 pounds CO2 per kWh, the power consumed is 100 Watts over a usage time of 8 hours is equivalent to 1.456 pounds CO2 per day:

$$CO2\ Emissions\ Value = location\ CO2\ emissions\ rate * Power\ Consumed * Usage\ Time$$

The recommendation agent 290 in an embodiment may perform this determination of CO2 emissions value for each indexed and classified JSON incident it receives from the device index mapper 263 over the CO2 emissions state determination training period. Following such a determination, the recommendation agent 290 may append one or more JSON events indicating the CO2 emissions value within the indexed and classified JSON incident most recently received from the device index mapper 263 and upon which such a determination was made for the client information handling system. The recommendation agent in an embodiment may edit the indexed and classified JSON incident described above with respect to block 318 to include a current monitoring period CO2 emissions value for the client information handling system. For example, the recommendation agent 290 may edit the classified and indexed JSON incident described above with respect to blocks 318 to generate the below CO2 determined JSON incident:

```
{
"data" :
 {
  "event_id" : 123460,
  "source_ID" : power_analytics_module,
  "timestamp_unixtime_ms" : 1544145450,
  "client_device_ID" : 456789,
  "client_device_model" : Laptop_7400,
  "location" : New Delhi, India,
  "custom_flags" :
     {
        "videoconferencing_application_NID_usage" : 0.9,
        "videoconferencing_application_GPU_usage" : 0.95,
        "temperature_F" : above_140,
        "CO2_emissions_value_lbsCO2" : 1.456;
     }
  "device_current_state :
     {
        "NID_1_type" : WLAN,
        "NID_2_type" : WWAN,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "fan_driver_version" : 14.2,
        "Display_mode" : high_definition,
        "Camera_type" : webcam,
        "Camera_detection_mode" : continuous_monitor,
        "Camera_capture_mode" : high_resolution,
        "temperature_F" : 142,
        "Microphone_detection_mode" : continuous_monitor,
        "OS_Version" : 10.2,
        "usage_time_hours_perday" : 8,
        "total_power_consumption_watts_perday" : 100,
        "GPU_power_consumption_watts : 50,
        "Videoconferencing_app_user_session_participation_status" : participant,
        "videoconferencing_application_visual_effects_status" : ON,
        "videoconferencing_application_audio_filter_status" : ON,
     }
 }
}
{
 "incident_class" : App_usage,
}
```

These monitoring periods in which JSON incidents are gathered from a plurality of client information handling systems (e.g., 250 and 270) may occur repeatedly throughout the lifecycle of each client information handling system (e.g., 250 and 270) in order to track and limit CO2 emissions due to execution of a videoconferencing application at the client information handling systems (e.g., 250 and 270). The method may then end.

Figure 4:
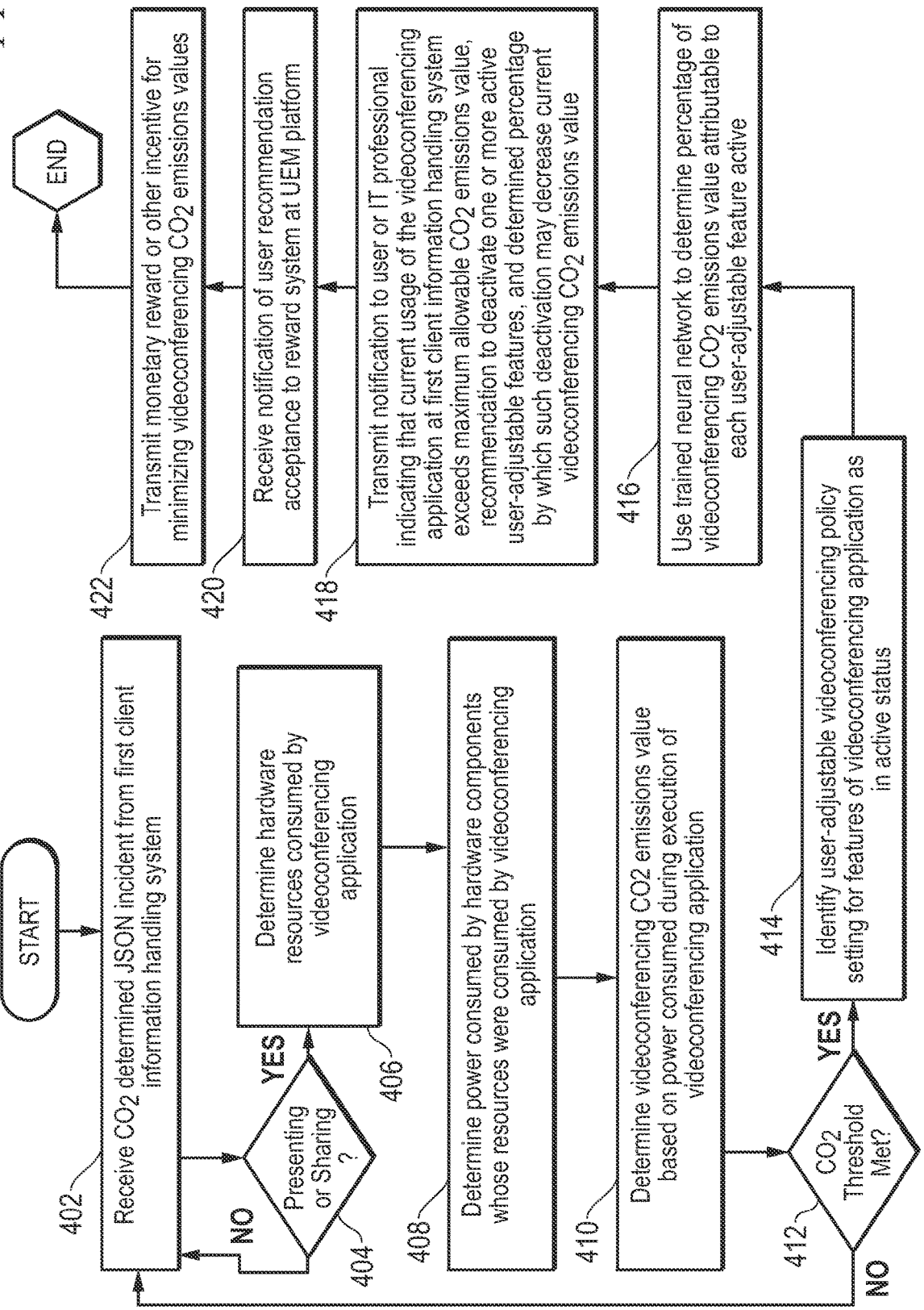
FIG. 4 is a flow diagram illustrating a method of tracking and limiting $CO_2$ emissions due to execution of a videoconferencing application at one or more client information handling systems in a videoconferencing session according to an embodiment of the present disclosure.

FIG. 4 is a flow diagram illustrating a method of tracking and limiting CO2 emissions due to execution of a videoconferencing application at one or more client information handling systems by de-activating user-adjustable features of the videoconferencing application according to an embodiment of the present disclosure. As described herein, the videoconferencing application CO2 emissions minimization system in an embodiment may generate recommended CO2 reduction instructions for de-activating user-adjustable policy videoconference settings for features of videoconferencing software applications to limit CO2 emissions due to execution of such videoconferencing software applications. In an embodiment, the videoconferencing application CO2 emissions minimization system operating at the UEM platform 200 may track CO2 emissions due to execution of a videoconferencing application at a client information handling system managed by an enterprise management system.

At block 402, the communication agent operating at the UEM platform in an embodiment may receive, and store in telemetry, CO2 determined JSON incidents from a plurality of client information handling systems over a plurality of monitoring periods. These CO2 determined JSON incidents may include operational telemetry measurements, including user-adjustable operational telemetry measurements, such as power analytics, software application analytics, and event viewer error logs, as well as determined CO2 emissions values unique to each client information handling system. These CO2 determined JSON incidents may be gathered (e.g., as described above with respect to blocks 314-316 of FIG. 3) during routine monitoring periods from a plurality of client information handling systems at the cloud-based videoconferencing application CO2 emissions minimization system. For example, the communication agent 281 in an embodiment described above with respect to FIG. 2 may receive a plurality of CO2 determined JSON incidents from the first client information handling system 250 and the second client information handling system 270 over a plurality of monitoring periods. It is contemplated that the videoconferencing application CO2 emissions minimization system may receive a plurality of CO2 determined JSON incidents from all or a managed set of participant client information handling systems. More specifically, the communication agent 281 in an embodiment may receive a CO2 determined JSON incident, similar to that described above at block 320 of FIG. 3 for the first client information handling system 250 during operation by a first user of the first client information handling system (e.g., in New Delhi, India) that is a videoconference session participant.

The videoconferencing application CO2 emissions minimization system in an embodiment may determine at block 404 whether the user of the client information handling system is engaged in a videoconferencing session as a host or is sharing a screen image. The videoconferencing application CO2 emissions minimization system 280 in an embodiment may make such a determine in an embodiment based on CO2 determined JSON incidents received from the client information handling system (e.g., 250). For example, the videoconferencing application CO2 emissions minimization system 280 may refer to the CO2 determined JSON incident described above to identify the JSON event named "videoconferencing_app_user_session_participation_status," having a value of "participant," indicating the user has joined an active videoconferencing user session as a participant, rather than as a host. In other embodiments, the JSON event "videoconferencing_app_user_session_participation_status" may have another value such as "host," indicating that the user is participating as a host, or "screen_share," indicating that the user is sharing a screen image of the client information handling system 250. Host or screen-sharing participant designations within JSONs for particular client information handling systems may have been determined from received data indicating a videoconferencing policy setting that designated a host designation or a screen share function setting has an active status with the videoconferencing application during the videoconference session. The videoconferencing application CO2 emissions minimization system 280 in one embodiment may only suggest limiting CO2 emissions due to execution of the videoconferencing application when the user is not participating as a host or sharing a screen image within the active user session. If the videoconferencing application CO2 emissions minimization system determines the user is engaged in a videoconferencing application user session as a host or is sharing a screen image, the method may thus proceed back to block 402 for routine monitoring of the CO2 determined JSON incidents for that client information handling system 250. If the videoconferencing application CO2 emissions minimization system determines the user is engaged as a participant of a videoconferencing user session, but is not hosting or sharing a screen image, the method may proceed to block 404 to track CO2 emissions due to execution of the videoconferencing application at the client information handling system.

At block 406, in an embodiment in which it is determined that a user of a client information handling system is participating in a videoconferencing user session in which she is not the host or presenter, the videoconferencing application CO2 emissions minimization system may determine, based on the received CO2 determined JSON incident, hardware resources consumed by the videoconferencing application. For example, the videoconferencing application CO2 emissions minimization system 280 may refer to the CO2 determined JSON incident described above to identify a JSON event named "videoconferencing_applicaiton_GPU_usage," having a value of 0.95 indicating that the videoconferencing application consumed 95% of the available resources for the GPU 242 of the client information handling system 250. As another example, the videoconferencing application CO2 emissions minimization system 280 may refer to the CO2 determined JSON incident described above to identify a JSON event named "videoconferencing_applicaiton_NID_usage," having a value of 0.9 indicating that the videoconferencing application consumed 90% of the available resources for the network interface device 220 of the client information handling system 250. In other embodiments, the CO2 determined JSON incident may also provide similar percentage values of the resources for other hardware components used by the videoconferencing application, such as other types of processors 242 (e.g., CPU, VPU), the microphone 249, the camera 247, the display 245, the memory 246, the fan 243, battery 244, or GPS unit 248.

The videoconferencing application CO2 emissions minimization system in an embodiment may determine at block 408, based on the received CO2 determined JSON incident, power consumed by various hardware components of the client information handling system. For example, the videoconferencing application CO2 emissions minimization system 280 may refer to the CO2 determined JSON incident described above to identify a JSON event named "GPU_power_consumption_watts," having a value of 50, indicating that the GPU 242 for the client information handling system 250 consumed 50 Watts. In other embodiments, the CO2 determined JSON incident may also provide similar power consumption values for other hardware components, such as the network interface device 220, other types of processors 242 (e.g., CPU, VPU), the microphone 249, the camera 247, the display 245, the memory 246, the fan 243, battery 244, or GPS unit 248.

At block 410, the videoconferencing application CO2 emissions minimization system in an embodiment may determine a videoconferencing CO2 emissions value indicating an amount of CO2 emitted due to execution of the videoconferencing application based on these power and resources consumption determinations described directly above. For example, the videoconferencing application CO2 emissions minimization system 280 in an embodiment may determine that 95% of the 50 Watts consumed by the GPU, or 47.5 Watts of power were consumed during execution of the videoconferencing application. The videoconferencing application CO2 emissions minimization system 280 may also determine that 47.5 Watts of power comprises 47.5% of the 100 Watts consumed by all hardware components of the client information handling system 250, combined. In an embodiment, the videoconferencing application CO2 emissions minimization system 280 may perform such a determination of the percentage of total power consumed by each of the hardware components (e.g., 220, 242, 243, 244, 245, 246, 247, 248, or 249) during execution of the videoconferencing application. Summing each of these determinations for each of the hardware components (e.g., 220, 242, 245, 244, 245, 246, 247, 248, or 249) may provide an overall percentage of total power consumed by the client information handling system 250 during execution of the videoconferencing software application in an embodiment. The videoconferencing CO2 emissions value in an embodiment may then be determined by the videoconferencing application CO2 emissions minimization system 280 by multiplying this overall percentage of total power consumed by the client information handling system 250 during execution of the videoconferencing application by the CO2 emissions value given within the CO2 determined JSON incident. The CO2 emissions value may include amounts of CO2 emissions per kWh of power provided to a client information handling system at a physical location. This CO2 emissions per kWh for physical location power sources may be available or provided by power providers or may be available to an enterprise for its facilities. For example, in an embodiment in which 47.5% of all power consumed by the client information handling system occurred due to execution of the client information handling system 250, and the CO2 determined JSON incident includes a JSON event named "CO2_emissions_value_lbsCO2," having a value of 1.456, the videoconferencing application CO2 emissions minimization system 280 may determine a videoconferencing CO2 emissions value of 0.69 pounds of CO2 (e.g., 47.5% of 1.456 pounds CO2).

The videoconferencing application CO2 emissions minimization system in an embodiment at block 412 may determine whether the videoconferencing CO2 emissions value determined at block 410 meets a CO2 emissions threshold value set for the client information handling system or its portion of the participant information handling systems in a videoconference session having a videoconference session CO2 emissions threshold value set by the enterprise management system. In various embodiments described herein, an IT professional may set a CO2 emissions threshold value for each of the client information handling systems (e.g., 250 or 270) that dictates a maximum CO2 emitted by a client information handling system (e.g., 250 or 270) during execution of a videoconferencing application to trigger a warning of high CO2 emissions at the client information handling system due to execution of the videoconferencing application and generation of recommended CO2 reduction instructions for lowering such CO2 emissions. These CO2 emissions threshold values may be set for all client information handling systems (e.g., 250 and 270) in some cases. For example, each client information handling system (e.g., 250 or 270) may be associated with a CO2 emissions threshold value equivalent to an average of CO2 emitted across all client information handling systems (e.g., 250 or 270) within the enterprise system engaged in active user sessions in which the user is not the host or sharing a screen image. In other cases, the CO2 emissions threshold values may be set for groups of client information handling systems based on their geographic locations or other criteria such as desired CO2 targets by an IT manager. As described herein, the CO2 emissions for a client information handling system (e.g., 250 or 270) may depend upon geographic location at which the client information handling system (e.g., 250 or 270) consumes power. Thus, the CO2 emissions threshold values in an embodiment may be set to apply to all client information handling systems within the enterprise system located within the same country, city, or region, in which the user is not the host or sharing a screen image. In still other cases, the CO2 emissions threshold values may be on a machine-by-machine basis. For example, the CO2 emissions threshold value may be set as a percentage (e.g., 25%, 50%, 75%, etc.) of each client information handling system's (e.g., 250) determined CO2 emissions value. If the videoconferencing CO2 emissions value for the client information handling system 250 or its portion of the participant information handling systems in a videoconference session does not meet the CO2 emissions threshold value set for that client information handling system 250, no action may yet be needed on behalf of the videoconferencing application CO2 emissions minimization system, and the method may proceed back to block 402 for routine monitoring of CO2 determined JSON incidents from that client information handling system 250. If the videoconferencing CO2 emissions value for the client information handling system 250 meets or exceeds the CO2 emissions threshold value set for that client information handling system 250 or its portion of the participant information handling systems in a videoconference session, the method may proceed to block 416 to identify adjustments that may be made to user-adjustable videoconferencing policy settings for optional features of the videoconferencing application to lower the videoconferencing CO2 emissions value.

At block 414, in an embodiment in which the videoconferencing application CO2 emissions minimization system determines that a client information handling system has reached its CO2 emissions threshold value, the videoconferencing application CO2 emissions minimization system may identify one or more features of the videoconferencing application that are user-adjustable through adjustment of videoconferencing policy settings for that application and that may be altered to decrease the videoconferencing application CO2 emissions value. For example, the videoconferencing application CO2 emissions minimization system in various embodiments may determine whether certain user-adjustable videoconferencing policy settings for features of the videoconferencing application are currently set to active, such as microphone usage, camera usage, high-definition video recording, high-definition audio recording, application of virtual backgrounds or other visual effects or filters to captured images, of application of audio filters to captured audio samples.

Active use of any one of these features in various embodiments may increase the power consumed by various hardware components (e.g., camera 247, microphone 249, central processing unit or graphical processing unit 242, memory 246, or network interface device 220), consequently increasing CO2 emitted due to execution of the videoconferencing application. For example, the videoconferencing application CO2 emissions minimization system 280 in an embodiment may reference the CO2 determined JSON event described above to identify the JSON event named "camera_detection_mode," having a value of "continuous_monitor," indicating that the camera is set to a default recording mode. As another example, the videoconferencing application CO2 emissions minimization system 280 in an embodiment may reference the CO2 determined JSON event described above to identify the JSON event named "microphone_detection_mode," having a value of "continuous_monitor," indicating that the microphone is set to a default recording mode. In still another example, the videoconferencing application CO2 emissions minimization system 280 in an embodiment may reference the CO2 determined JSON event described above to identify the JSON event named "camera_capture_mode," having a value of "high_resolution," indicating that the camera is set to record in high resolution, which may increase power consumed by the camera 247 and the GPU 242 processing recorded images. In yet another example, the videoconferencing application CO2 emissions minimization system 280 in an embodiment may reference the CO2 determined JSON event described above to identify the JSON event named "videoconferencing_application_visual_effects_status" having a value of "on," indicating that one or more visual effects filters are being applied to recorded images, such as zooming, cropping, background image application, boundary recognition, face recognition, smoothing, or other visual effects filters. In still another example, the videoconferencing application CO2 emissions minimization system 280 in an embodiment may reference the CO2 determined JSON event described above to identify the JSON event named "videoconferencing_application_audio_filter_status" having a value of "on," indicating that one or more audio filters are being applied to recorded audio samples, such as noise reduction filters. One or more of these features of the videoconferencing application identified within the CO2 determined JSON incident in an embodiment may be user-adjustable by adjusting the videoconferencing policy settings for the videoconferencing application via the power analytics module 240, for example.

Upon identification of one or more videoconferencing policy settings for features of the videoconferencing application that are currently set to active status, the videoconferencing application CO2 emissions minimization system in an embodiment at block 416 may determine a policy setting CO2 emissions value describing the amount of CO2 emitted due to active use of each of the identified features of the videoconferencing application (e.g., as managed by various videoconferencing policy settings for the videoconferencing application). In one example embodiment, a rules based application may determine an effect on policy setting CO2 emissions values and changes to CO2 emissions for use or non-use of a feature. In another example embodiment, a neural network 286 may be trained in an embodiment to model a relationship between changes in the videoconferencing CO2 emissions value and an activity status for each of these user-adjustable policy videoconference settings of the videoconferencing application. The videoconferencing application CO2 emissions minimization system 280 in an embodiment may then use this trained neural network 286 to estimate the policy setting CO2 emissions value associated with each of the active features identified with videoconferencing policy settings having an active status as described directly above. The videoconferencing application CO2 emissions minimization system may use this information to determine a degree by which the user may decrease the videoconferencing CO2 emissions value by deactivating one or more of these videoconferencing policy settings for user-adjustable features of the videoconferencing application. For example, the videoconferencing application CO2 emissions minimization system 280 may determine that setting the camera to inactive, or ceasing recording of images via the camera 247 may decrease the determined CO2 emissions value by 5%. In another example, the videoconferencing application CO2 emissions minimization system 280 may determine that setting the microphone 249 to mute or inactive may decrease the determined CO2 emissions value by an additional 2%. This process may be repeated for each of the user-adjustable policy videoconference settings for the videoconferencing application currently set to active status, such as application of audio or visual effects to captured images or sound, or capture instructions for the camera 247.

The videoconferencing application CO2 emissions minimization system in an embodiment at block 418 may transmit a recommended CO2 reduction instruction to the user of the client information handling system 250 to deactivate one or more of these user-adjustable features (e.g., camera 247 set to record, microphone 249 set to record), as well as the estimated degree by which deactivation of each feature individually may decrease the videoconferencing CO2 emissions value (e.g., 5% and 2%, respectively). The transmitted recommended CO2 reduction instruction may be displayed in a window box or other GUI at the client information handling system, even during the videoconference session. In such a way, the videoconferencing application CO2 emissions minimization system 250 in embodiments may notify users of client information handling systems (e.g., 250) across an enterprise system of the effects of various features of videoconferencing applications on CO2 emissions and ensure each client information handling system (e.g., 250) operates below the videoconferencing CO2 emissions value set for that device. In another embodiment, the videoconferencing application CO2 emissions minimization system 250 in embodiments may notify users of client information handling systems (e.g., 250) across an enterprise system of the effects of various features of videoconferencing applications on CO2 emissions and ensure several participating or managed client information handling systems (e.g., 250) operate below the videoconferencing CO2 emissions value set for that videoconference session.

At block 420, the videoconferencing application CO2 emissions minimization system in an embodiment may receive a notification of user recommendation acceptance to a reward system at the UEM platform. For example, a reward system 283 may search telemetry 282 to identify a stored indication that the user of the client information handling system 250 has accepted a recommended CO2 reduction instruction to deactivate the camera, and that such deactivation resulted in 5% decrease in CO2 emitted due to execution of the videoconferencing application.

The videoconferencing application CO2 emissions minimization system in an embodiment at block 422 may transmit a monetary reward or other incentive for minimizing the videoconferencing CO2 emissions value to the client information handling system. The reward system 283 in an example embodiment may transmit an incentive to the user of the client information handling system 250 for display via GUI 291 to continue to decrease CO2 emitted due to execution of the videoconferencing application, as recommended by the videoconferencing application CO2 emissions minimization system 280. Such incentives may take the form of monetary values, credits, or recognition within the enterprise system.

In other embodiments in which users reject recommended CO2 reduction instructions for decreasing CO2 emitted during execution of videoconferencing applications, the videoconferencing application CO2 emissions minimization system 280 may report such rejections to IT professionals within the enterprise management system 210, for example. This may allow the enterprise management system 210 to monitor such potentially problematic users. In such a way, the videoconferencing application CO2 emissions minimization system in embodiments may notify users of client information handling systems across an enterprise system of the effects of various features of videoconferencing applications on CO2 emissions and ensure each client information handling system operates below the videoconferencing CO2 emissions value.

Figure 5:
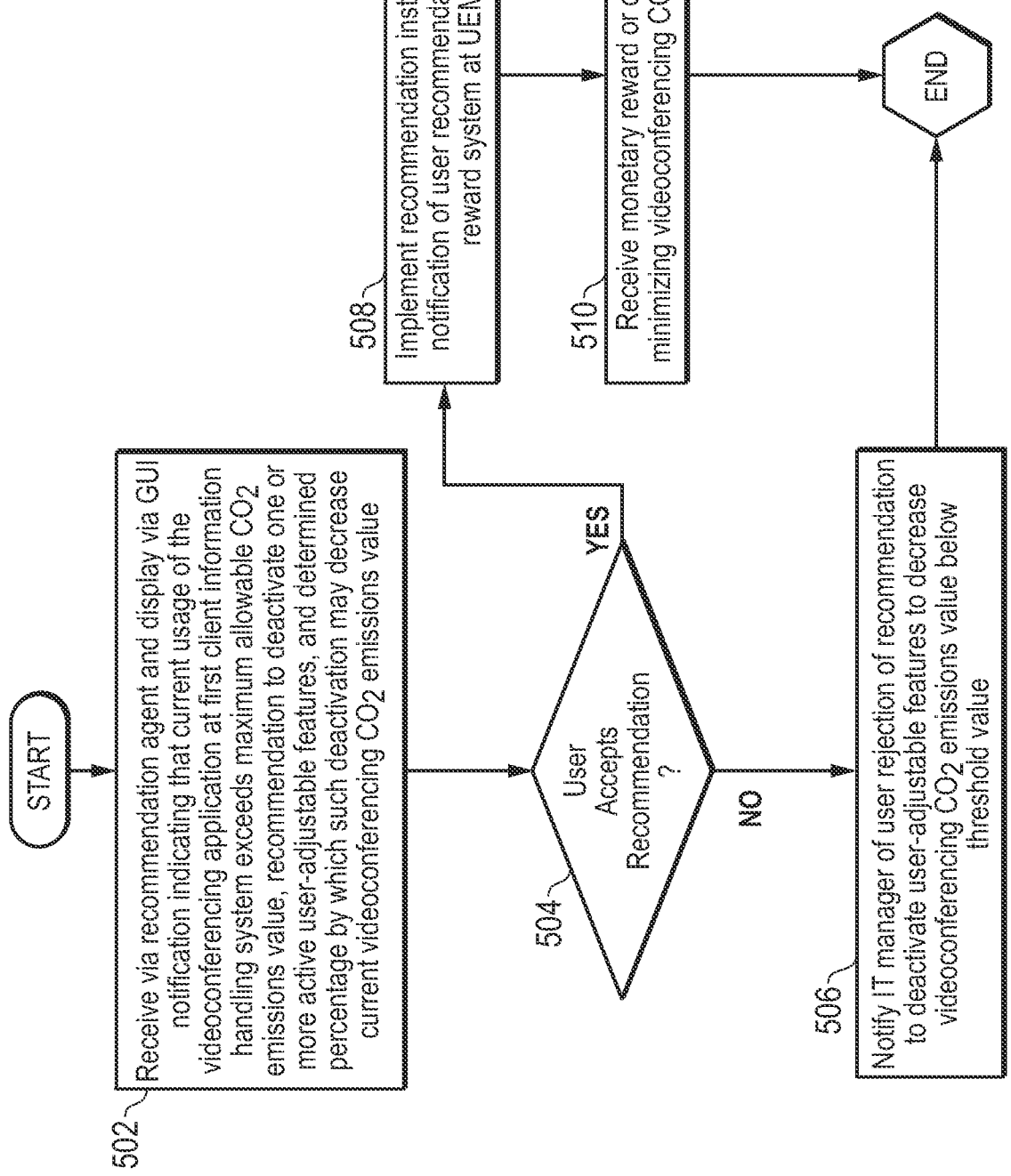
FIG. 5 is a flow diagram illustrating a method of rewarding a user of a client information handling system participating in a videoconference session for decreasing $CO_2$ emissions due to execution of a videoconferencing application according to an embodiment of the present disclosure.

FIG. 5 is a flow diagram illustrating a method of rewarding users of client information handling systems for implementing recommended CO2 reduction instructions for reducing CO2 emitted due to videoconferencing applications according to an embodiment of the present disclosure. As described herein, the videoconferencing application CO2 emissions minimization system in an embodiment may transmit a recommended CO2 reduction instruction to the user of a client information handling system to deactivate one or more of user-adjustable videoconferencing policy settings for features of a videoconferencing application, as well as the estimated degree by which deactivation of each feature individually may decrease a determined videoconferencing CO2 emissions value. The method of FIG. 5 may describe tracking and rewarding users who accept these transmitted recommended CO2 reduction instructions.

At block 502, the recommendation in an embodiment may receive from the videoconferencing application CO2 emissions minimization system and display via a graphical user interface (GUI) these recommended CO2 reduction instructions for deactivation of one or more user-adjustable videoconferencing policy settings for features of the videoconferencing application. These recommended CO2 reduction instructions and the degree by which each recommendation may decrease CO2 emissions due to execution of the videoconferencing application may be displayed to the user via the GUI 291. These recommended CO2 reduction instructions may include those described in greater detail above with respect to FIG. 4.

The recommendation agent in an embodiment may determine at block 504 whether the user has accepted the recommended CO2 reduction instructions. For example, the user of the client information handling system 250 in an embodiment may choose one or more, or none of the recommended CO2 reduction instructions for implementation at the client information handling system 250. As described herein, the videoconferencing application CO2 emissions minimization system may operate to reward users who successfully decrease CO2 emissions through implementation of these recommended CO2 reduction instructions and track users who choose not to implement those recommended CO2 reduction instructions. If the user chooses to implement a recommended CO2 reduction instructions, the method may proceed to block 508 for transmission of a notification of such user acceptance to the videoconferencing application CO2 emissions minimization system. If the user chooses not to implement a recommended CO2 reduction instruction, the method may proceed to block 506 to notify an IT manager of the enterprise management system 210 of such a rejection.

At block 506, in an embodiment in which the user rejects a recommended CO2 reduction instruction received from the videoconferencing application CO2 emissions minimization system 280, the recommendation agent 290 may transmit a recommendation rejection notification to the videoconferencing application CO2 emissions minimization system 280 for storage in telemetry 282. For example, in an embodiment in which the user rejects a recommended instruction to deactivate the microphone 249, the recommendation agent 290 may transmit a notification that the user rejected the recommendation to deactivate the microphone 249, as well as a notification that the neural network 286 predicted that that recommended CO2 reduction instruction could have decreased CO2 emissions due to execution of the videoconferencing application at the client information handling system 250 by 2%. The method may then end.

In an embodiment in which the user selects to implement one or more of the recommended instructions displayed via the GUI 291, the recommendation agent 290 at block 508 may work in tandem with the power analytics module 240 to adjust policy settings for the videoconferencing application to implement the recommended and user-approved CO2 reduction instructions. For example, in an embodiment in which the user has chosen to implement the recommended instruction to deactivate the camera 247 during the videoconferencing application user session, the power analytics module 240 may adjust the user-adjustable videoconferencing policy settings for the videoconferencing application to deactivate the camera 247, or may limit or cease power consumption by the camera 247. In another example, in an embodiment in which the user chooses to implement a recommended CO2 reduction instruction to deactivate a visual effects filter of the videoconferencing application, such as application of a virtual background, the power analytics module 240 may adjust the user-adjustable videoconferencing policy settings for the videoconferencing application to deactivate the visual effects feature(s) of the videoconferencing application. In such embodiments, the recommendation agent 290 may also transmit a recommendation acceptance notification to the videoconferencing application CO2 emissions minimization system 280 for storage in telemetry 282.

At block 510, the client information handling system may receive a monetary reward, credits, upgrades, or other incentive for minimizing videoconferencing CO2 emissions values. For example, users in an embodiment may be rewarded for accepting recommended CO2 reduction instructions for decreasing CO2 emitted during execution of the videoconferencing application at the client information handling system 250. More specifically, the recommendation agent 290 may receive the incentives or rewards described above at block 422 of FIG. 4 for display via GUI 291 to continue to decrease CO2 emitted due to execution of the videoconferencing application, as recommended by the videoconferencing application CO2 emissions minimization system 280. Such incentives may take the form of monetary values, credits, or recognition within the enterprise system. The method for rewarding users of client information handling systems for decreasing videoconferencing CO2 emissions values in an embodiment may then end.

The blocks of the flow diagrams of FIGS. 3, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A videoconferencing application carbon dioxide ($CO_2$) emissions minimization system executing on a unified endpoint management (UEM) platform information handling system comprising:
   a network interface device to receive operational telemetry measurements for a client information handling system, including power analytics, software application analytics, a geographic location, and a determined $CO_2$ emissions value determined for the client information handling system;
   a hardware processor executing code instructions of the videoconferencing application $CO_2$ emissions minimization system to determine that a videoconferencing $CO_2$ emissions value exceeds a $CO_2$ emissions threshold value, based on the determined $CO_2$ emissions value and power consumed during execution of a videoconferencing application at the client information handling system;
   the hardware processor to identify a currently active user-adjustable videoconferencing policy setting for the videoconferencing application; and
   the network interface device to transmit a recommended $CO_2$ reduction instruction for display at the client information handling system to de-active the user-adjustable videoconferencing policy setting to limit the videoconferencing $CO_2$ emissions value to the $CO_2$ emissions threshold value.

2. The information handling system of claim 1, wherein the determined $CO_2$ emissions value is determined at the client information handling system based on power consumption and the geographic location of the client information handling system, indicating $CO_2$ levels used in generating power for the client information handling system.

3. The information handling system of claim 1, wherein the currently active user-adjustable videoconferencing policy setting includes setting a microphone in an active status.

4. The information handling system of claim 1, wherein the currently active user-adjustable videoconferencing policy setting includes setting a camera in an active status.

5. The information handling system of claim 1 further comprising:
   the hardware processor to determine a user-adjustable videoconferencing policy setting for the videoconferencing application that the client information handling system is designated to host the videoconferencing session or that a screenshare function is set to inactive status; and
   exempting the client information handling system from recommended $CO_2$ reduction instruction.

6. The information handling system of claim 1 further comprising:
   the network interface device to receive an indication from the client information handling system that the recommended $CO_2$ reduction instruction to de-activate the user-adjustable policy videoconference setting has been implemented; and
   the network interface device transmitting a reward incentive to the user.

7. The information handling system of claim 1 the currently active user-adjustable videoconferencing policy setting includes setting the videoconferencing application to apply a background to video captured by a camera.

8. A method for minimizing carbon dioxide ($CO_2$) emissions due to execution of a videoconferencing application $CO_2$ emissions minimization system executing on a unified endpoint management (UEM) platform information handling system comprising:
   receiving, via a network interface device, operational telemetry measurements for a plurality of client information handling systems participating in a videoconference session, including power analytics, software application analytics, a geographic location, and a determined $CO_2$ emissions value determined for the client information handling systems;
   determining, via a hardware processor executing code instructions of the videoconferencing application $CO_2$ emissions minimization system, a videoconferencing $CO_2$ emissions value for the videoconference session that exceeds a $CO_2$ emissions threshold value, based on the determined $CO_2$ emissions value and power consumed during execution of a videoconferencing application at the client information handling systems;
   identifying, via the hardware processor, a first currently active user-adjustable videoconferencing policy setting for the videoconferencing application at a first client information handling system in the videoconference session that is not a host or screenshare presenter information handling system;
   identifying, via the hardware processor, a first policy setting $CO_2$ emissions value as a percentage of the videoconferencing $CO_2$ emissions value for the videoconference session attributable to the first currently active user-adjustable videoconferencing policy setting on the first client information handling system; and
   transmitting, via the network interface device, a recommended $CO_2$ reduction instruction for display at the first client information handling system to de-activate the first currently active user-adjustable videoconferencing policy setting to limit the videoconferencing $CO_2$ emissions value for the videoconference session to the $CO_2$ emissions threshold value.

9. The method of claim 8, wherein the recommended $CO_2$ reduction instruction includes an estimated videoconferencing $CO_2$ emissions decrease resulting from de-activation of the first currently active user-adjustable videoconferencing policy setting at the first information handling system.

10. The method of claim 8 further comprising:
    identifying, via the hardware processor, a second currently active user-adjustable videoconferencing policy setting for the videoconferencing application at a second client information handling system in the videoconference session that is not a host or screenshare presenter information handling system;
    identifying, via the hardware processor, a second policy setting $CO_2$ emissions value as a percentage of the videoconferencing $CO_2$ emissions value for the videoconference session attributable to the second currently active user-adjustable videoconferencing policy setting on the second client information handling system; and
    transmitting, via the network interface device, a recommended $CO_2$ reduction instruction for display at the second client information handling system to de-activate the second currently active user-adjustable videoconferencing policy setting to limit the videoconferencing $CO_2$ emissions value for the videoconference session to the $CO_2$ emissions threshold value.

11. The method of claim 8 further comprising:
    the hardware processor to identify the first policy setting $CO_2$ emissions value, via a neural network trained to model a relationship between the videoconferencing $CO_2$ emissions value and an activity status for each of a plurality of user-adjustable videoconferencing policy settings of plural client information handling systems participating in the videoconference session including the first currently active, user-adjustable videoconferencing policy setting.

12. The method of claim 8, wherein the first currently active user-adjustable videoconferencing policy setting includes setting a camera to record in high-definition.

13. The method of claim 8, wherein the first currently active user-adjustable videoconferencing policy setting includes setting the videoconferencing application to apply a visual effects filter to video captured by a camera.

14. The method of claim 8, wherein the first currently active user-adjustable videoconferencing policy setting includes setting the videoconferencing application to apply an audio filter to audio captured by a microphone.

15. A videoconferencing application carbon dioxide ($CO_2$) emissions minimization system executing on a unified endpoint management (UEM) platform information handling system comprising:
   a network interface device to receive operational telemetry measurements for a client information handling system, including power analytics, software application analytics, a geographic location, and a determined $CO_2$ emissions value determined for the client information handling system;
   a hardware processor executing code instructions of the videoconferencing application $CO_2$ emissions minimization system to determine that a videoconferencing $CO_2$ emissions value exceeds a $CO_2$ emissions threshold value based on the determined $CO_2$ emissions value and power consumed during execution of a videoconferencing application at the client information handling system;
   the hardware processor to determine a first user-adjustable videoconferencing policy setting for the videoconferencing application designates a user of the client information handling system as a host of a videoconferencing session or that a screenshare function setting from the client information handling system is set to inactive status;
   the hardware processor to identify a currently active second user-adjustable videoconferencing policy setting for the videoconferencing application; and
   the network interface device to generate and transmit a recommended $CO_2$ reduction instruction for display at the client information handling system to de-activate the currently active second user-adjustable videoconferencing policy setting to limit the videoconferencing $CO_2$ emissions value to the $CO_2$ emissions threshold value.

16. The information handling system of claim 15 further comprising:
   the network interface device to receive an indication from the client information handling system that the user implemented the recommended $CO_2$ reduction instruction to de-activate the user-adjustable videoconferencing policy setting; and
   the network interface device to notify an IT manager for the client information handling system that the user accepted the recommended $CO_2$ reduction instruction.

17. The information handling system of claim 15, wherein the determined $CO_2$ emissions value is determined at the client information handling system based on power consumption and the geographic location of the client information handling system, indicating $CO_2$ levels used in generating power for the client information handling system.

18. The information handling system of claim 15, wherein the currently active second user-adjustable videoconferencing policy setting includes setting a microphone in an active status.

19. The information handling system of claim 15, wherein the currently active second user-adjustable videoconferencing policy setting includes a setting a camera in an active status.

20. The information handling system of claim 15 further comprising:
   the network interface device to receive an indication from the client information handling system that the user implemented the recommended $CO_2$ reduction instruction to de-activate the second user-adjustable videoconferencing policy setting; and
   the network interface device to transmit a reward incentive to the user.

* * * * *